United States Patent [19]

Binkerd et al.

[11] Patent Number: 4,623,760

[45] Date of Patent: Nov. 18, 1986

[54] SIGNALING PROTOCOL INTERFACE CHANNEL UNIT

[75] Inventors: Mark S. Binkerd, Warrenville; William C. Sand, St. Charles, both of Ill.

[73] Assignee: AT&T Bell Laboratories, Murray Hill, N.J.

[21] Appl. No.: 546,336

[22] Filed: Oct. 28, 1983

[51] Int. Cl.[4] .......................... H04J 3/22; H04M 7/10
[52] U.S. Cl. ................................ 379/232; 370/110.1; 379/377
[58] Field of Search ................... 370/110.1, 110.2, 79, 370/84, 58, 66, 43; 179/18 ES, 18 AH, 7.1 R; 178/3, 2 B, 26 A, 26 R

[56] References Cited

U.S. PATENT DOCUMENTS

| | | | |
|---|---|---|---|
| 4,068,104 | 1/1978 | Werth et al. | 179/175.3 R |
| 4,133,979 | 1/1979 | Helliwell et al. | 370/110.2 |
| 4,187,399 | 2/1980 | Maxfield et al. | 370/58 |
| 4,191,857 | 3/1980 | McLaughlin et al. | 370/110.1 |
| 4,268,722 | 5/1981 | Little et al. | 179/2 EB |
| 4,273,962 | 6/1981 | Wolfe | 179/7.1 R |
| 4,431,864 | 2/1984 | Sturdevant, Jr. | 178/3 |

*Primary Examiner*—Thomas W. Brown
*Attorney, Agent, or Firm*—Richard J. Godlewski

[57] ABSTRACT

Disclosed is a channel unit for directly interconnecting a toll office multiplex line and a terminal unit line such as that of a private branch exchange (PBX) or a telephone station set, thereby eliminating the normal local end office interconnection. In particular, the channel unit interfaces the different signaling protocols of the two lines and generates call progress controls signals such as dial tone and audible ringing which are normally generated by the local end office. The channel unit comprises a converter for each line for converting the electrical interface signals representative of the busy and idle conditions of the line to logic levels also representative of the busy and idle conditions of the line. A predetermined series of these logic levels form a control signal that indicates the state of a call on the line. Since the control signal indicative of the state of the call on one line is typically not useable by the other line, a microprocessor included in the unit generates a second control signal to advance the state of the call on the other line to an equivalent call state. An additional converter then converts the logic levels of this second control signal to the electrical interface signals of the other line to advance the state of the call to the equivalent call state. The unit further comprises a receiver and transmitter for exchanging dial pulse and dual tone multifrequency address signals between the lines. Also, included are circuits for applying call progress control signals such as dial-tone, audible ringing, and power ringing to the lines.

32 Claims, 27 Drawing Figures

PBX ONE-WAY OUTGOING
IDLE STATE ROUTINE

ADDRESS DIGIT
INTERRUPT ROUTINE

PBX ONE-WAY INCOMING
IDLE STATE ROUTINE

PBX ONE-WAY INCOMING ADDRESSING STATE ROUTINE

SIGNALING PROTOCOL INTERFACE CHANNEL UNIT

TECHNICAL FIELD

This invention relates to communication systems and particularly to a channel unit for interfacing communications lines utilizing different signaling protocols.

BACKGROUND OF THE INVENTION

The channel unit is well known for converting message and control signals exchanged between one channel of a carrier transmission facility and a telephone switching office communications line. All of the channel units that connect to the same carrier facility have the same carrier facility interface; however, the terminal unit interface of each channel unit changes as a function of the type of service and terminal unit.

Common message service channel units interconnect telephone offices that serve the switched telephone network. These connections, called interoffice lines, interconnect two end switching offices, two transit offices, or an end office and a transit office.

Special service channel units usually interconnect a specific customer to an end office. In one application, a local customer's station set is connected to a remote end office by an interoffice carrier channel line. This foreign exchange service is commonly used for a business with a large community of customers in a neighboring city. The remote end office provides call progress control signals such as dial tone and audible ringing via the message path of the interoffice carrier line. However, the remote end must usually transmit information on a separate interoffice carrier line to ring the local customer's station set.

In another special service application, a carrier facility line connects a private branch exchange (PBX) to a local end office switch, as with a large business customer. Here again, the end office supplies dial tone and audible ringing via the message path of the carrier line. Alternatively, the end office may send control information for the PBX to generate the various call progress control signals.

In most applications, the transmission facility as well as the channel unit must transmit certain control signals in addition to the message signal. These well-known control signals include supervisory, address, and call progress control signals and are used to oversee the dynamic nature of the traffic that is usually associated with the service.

Supervisory control signals are used to: (1) seize control of the line in response to a service request; (2) oversee the flow of address signals exchanged between originating and terminating telephone offices; and (3) inform the originating office when the called party answers and disconnects. Supervisory control signals typically comprise a series or pattern of d.c. electrical interface signals, usually over some period of time, that indicate the supervisory state of the call on the line and are applied either to the message signal path or to a separate control signal path. The d.c. electrical interface signals used for the particular line represent the "on-hook" and "off-hook" conditions of the line.

Address control signals transfer call routing information from the originating equipment to the terminating office. Address control signals may be transmitted as an analog signal within the message signal frequency band or as a series of d.c. electrical interface signals that normally change at a rate higher than d.c. supervisory signals. The detection, transmission, and reproduction of d.c. address control signals is similar to that of d.c. supervisory control signals. Thus, only one set of electrical interface signals representative of the "on-hook" and "off-hook" conditions of the line may be needed for a particular terminal unit or carrier facility channel line.

Similar to supervisory control signals, call progress control signals alert the calling and called parties as to the progress of the call, but are usually analog as opposed to d.c. signals. As previously noted, these call progress control signals are normally provided by the end office. Prior art channel units do not generate call progress signals, but simply pass them as a supervisory, address, or message signal.

Associated with the control signals on each communication line is a signaling protocol. This signaling protocol consists of those control signals that are exchanged on the line to originate a call and to advance the call from one supervisory state to another. Each control signal comprises a predetermined series, set, combination, or pattern of electrical interface signals. The d.c. electrical interface signals on each line typically represent the "on-hook/off-hook", "busy/idle", or the "open/closed loop" condition of the line. However, it is the control signals or the various combinations or patterns of electrical interface signals, usually with respect to time, that are used to indicate the supervisory state of the call on the line, such as "idle", "seized", "answer", "disconnect", etc. Prior art channel units simply convert the electrical interface signals of one line to the different electrical interface signals of another line. Prior art channel units do not recognize patterns of electrical interface signals. Thus, communication lines with different signaling protocols cannot be interconnected with prior art channel units. Previously, this interconnection could only be made through a switching office.

Connecting a carrier channel from a transit office directly to a PBX or a telephone station set while eliminating the end office interconnection creates numerous problems. First, a transit office, also referred to as a toll office, typically does not generate call progress control signals. Second, many types of PBX signaling protocols are incompatible with toll office signaling protocols. For example, a one-way incoming PBX line with immediate start operation does not return a wink supervisory signal that a one-way outgoing toll office line with a wink start operation expects to receive in response to seizing the PBX line. Third, toll offices generally do not respond to analog control signals such as dual tone multifrequency address signals. Lastly, prior art channel units convert only one set of electrical interface signals to another, thereby requiring a separately designed channel unit for each different type of terminal unit. All of these problems are normally solved by the end office; however, without the end office, it would be extremely costly to retrofit or redesign toll offices to perform these end office functions.

SUMMARY OF THE INVENTION

The foregoing problems of directly interconnecting, for example, a toll office line and a terminal unit line are solved and a technical advance is achieved by a novel channel unit for interfacing communications lines utilizing different signaling protocols. For use with a first communications line having a first signaling protocol and a second communications line utilizing a second signaling protocol different from the first protocol, the channel unit includes a controller responsive to a first set of electrical interface signals indicative of a state in the first signaling protocol of a call on the first line for generating a control signal. In response to the receipt of the generated control signal, a second line transmit converter also included in the channel unit generates on the second line a second set of electrical interface signals. This second set of electrical interface signals signifies the state of the call in the second signaling protocol corresponding to the state of the call in the first signaling protocol.

In one illustrative embodiment of the invention, the channel unit comprises a toll office receive line converter for converting the well-known "A" and "B" signaling bits of a digital DS-1 format signal received from a wink start toll office carrier channel line to high and low logic level signals. Responsive to a first series of logic level signals that is indicative of the state of the call on the toll office line, a stored program controller generates a second series of logic level signals for an immediate start PBX line. A second converter then converts the logic level signals of the second series to PBX electrical interface signals for transmission on the PBX line. These PBX electrical interface signals advance the state of the call on the PBX line to a state that corresponds to the state of the call on the toll office line. In addition, two additional converters are included to pass control signals in the opposite direction from the PBX line to the toll office line. When either line requires a control signal that the other is not normally expected to transmit, the controller also generates another series of logic level signals for the required control signal. For example, this occurs when the toll office seizes the toll office line and expects a wink supervisory signal back. Since an immediate start PBX line does not return a wink signal in response to a seizure, the controller generates the wink signal after the PBX line is seized.

In accordance with another feature of this invention, the channel unit includes a receiver for converting analog address signals from the PBX line to digital address signals for the toll office line. Also included is a transmitter for sending analog address signals to the PBX line in response to digital address signals from the toll office line. The controller also converts digital address signals at one pulse rate from the PBX to another pulse rate for the toll office.

In accordance with still another feature of this invention, the channel unit converts the electrical interface signals of the toll office line to the electrical interface signals of any one of a plurality of different PBX lines.

In accordance with yet another feature of the invention, the channel comprises circuits for generating call progress control signals such as dial tone and audible ringing.

BRIEF DESCRIPTION OF THE DRAWING

The invention may be better understood from the following detailed description when read with reference to the drawing in which.

DETAILED DESCRIPTION

Figure 1:
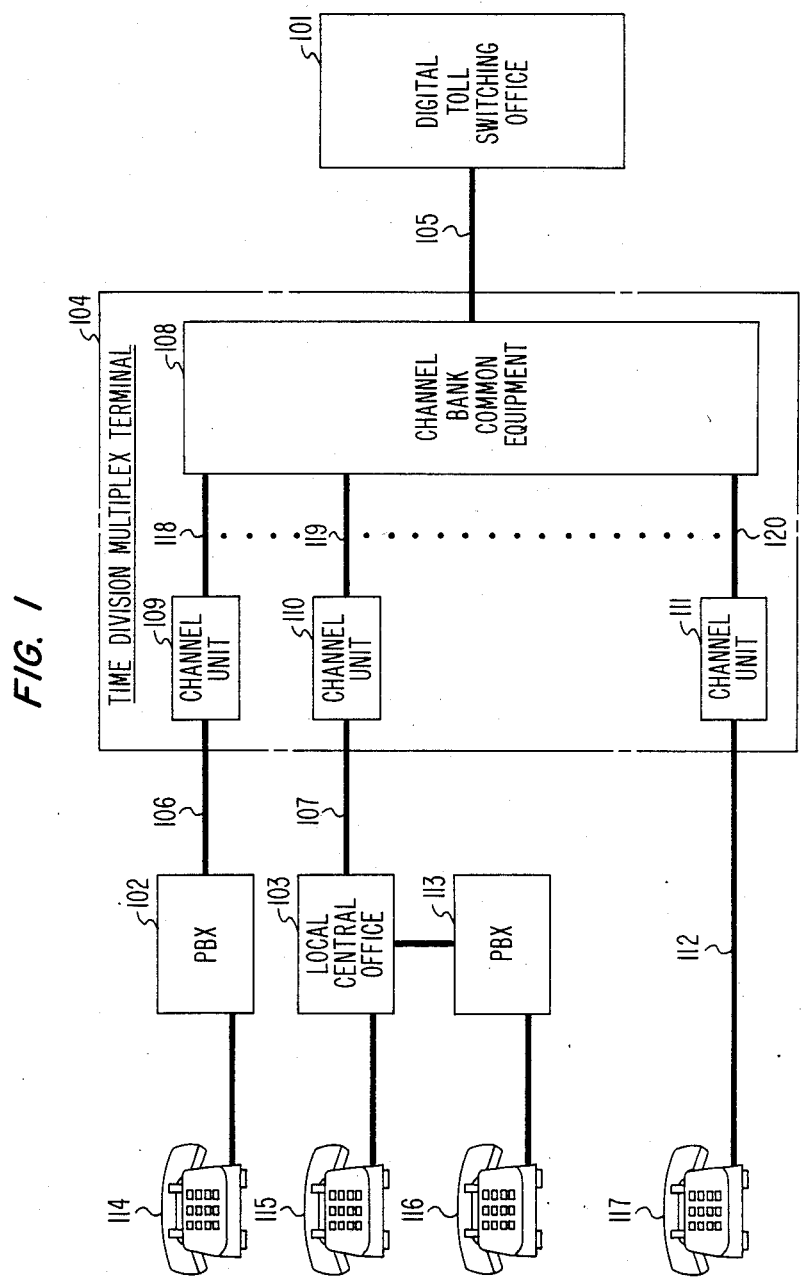
FIG. 1 shows a block diagram of a typical communications network having a digital toll switching office serving a plurality of users through a time-division multiplex terminal.

An illustrative digital channel unit for directly interfacing the different signaling protocols, as well as the the different types of supervisory and address electrical interface signals associated therewith, of a toll switching office line and a terminal unit line such as that of a private branch exchange (PBX) or a customer station set is depicted in FIG. 1. FIG. 1 shows a typical communications network having digital toll switching office 101 which serves PBX 102, local central office 103, and customer station set 117 through time-division multiplex terminal 104. Private branch exchange 102 and local central office 103 contain switching apparatus for providing communication services to a plurality of customer station sets such as 114 and 115. As is commonly arranged for business customers, local central office 103 also serves PBX 113 which in turn serves a plurality of customer station sets such as 116. Time-division multiplex terminal 104 interconnects digital carrier facility 105 from toll office 101 and communication lines 106, 107, and 112 from PBX 102, local end office 103, and station set 117, respectively.

Digital toll switching office 101 is a typical transit switching system such as the 4ESS TM switch which is manufactured by the Western Electric Company. This switching system is described in detail in *The Bell System Technical Journal*, Volume 56, Number 7, September, 1977, and Volume 60, Number 6, Part 2, July-August, 1981, and need not be fully described herein for the reader to understand the present invention.

Local central office 103 is suitably an electronic program-controlled switching system of the type disclosed in *The Bell System Technical Journal,* Volume 43, Number 5, Parts 1 and 2, September, 1964.

Private branch exchange 102 and 113 may be any well-known private branch exchange which is used to distribute calls to customer station sets.

Time-division multiplex terminal 104 is a digital channel bank such as the D4 digital channel bank and comprises common equipment 108 and a plurality of individual channel units such as 109, 110, and 111. The D4 digital channel bank is suitable for use with any well known T-1 type digital carrier facility such as 105.

The D4 digital channel bank is disclosed in *The Bell System Technical Journal,* Volume 61, Number 9, Part 3, November 1982, which may be referred to for a more comprehensive understanding of the construction and operation of a digital channel bank. The channel bank common equipment interfaces the digital carrier facility with the individual channel units. In addition, the channel bank common equipment performs pulse code modulation encoding and decoding as well as multiplexing and demultiplexing the signals between the individual channel units and the digital carrier facility. The individual channel units provide an electrical interface for the lines from the terminating equipment to the multiplex common equipment.

Channel unit 110 is a well-known E and M type channel unit for interfacing end office line 107 and toll office carrier channel line 119. In a typical manner, local end office 103 connects to PBX 113 which is usually located on the premises of a business customer to interconnect a plurality of PBX station sets such as 116.

However, in accordance with this invention, channel unit 109 directly interfaces toll office carrier channel line 118 and PBX line 106, thereby eliminating the connection through local end office 103. Similarly, channel unit 111 interfaces toll office carrier channel line 120 and customer station line 112.

Figure 2:
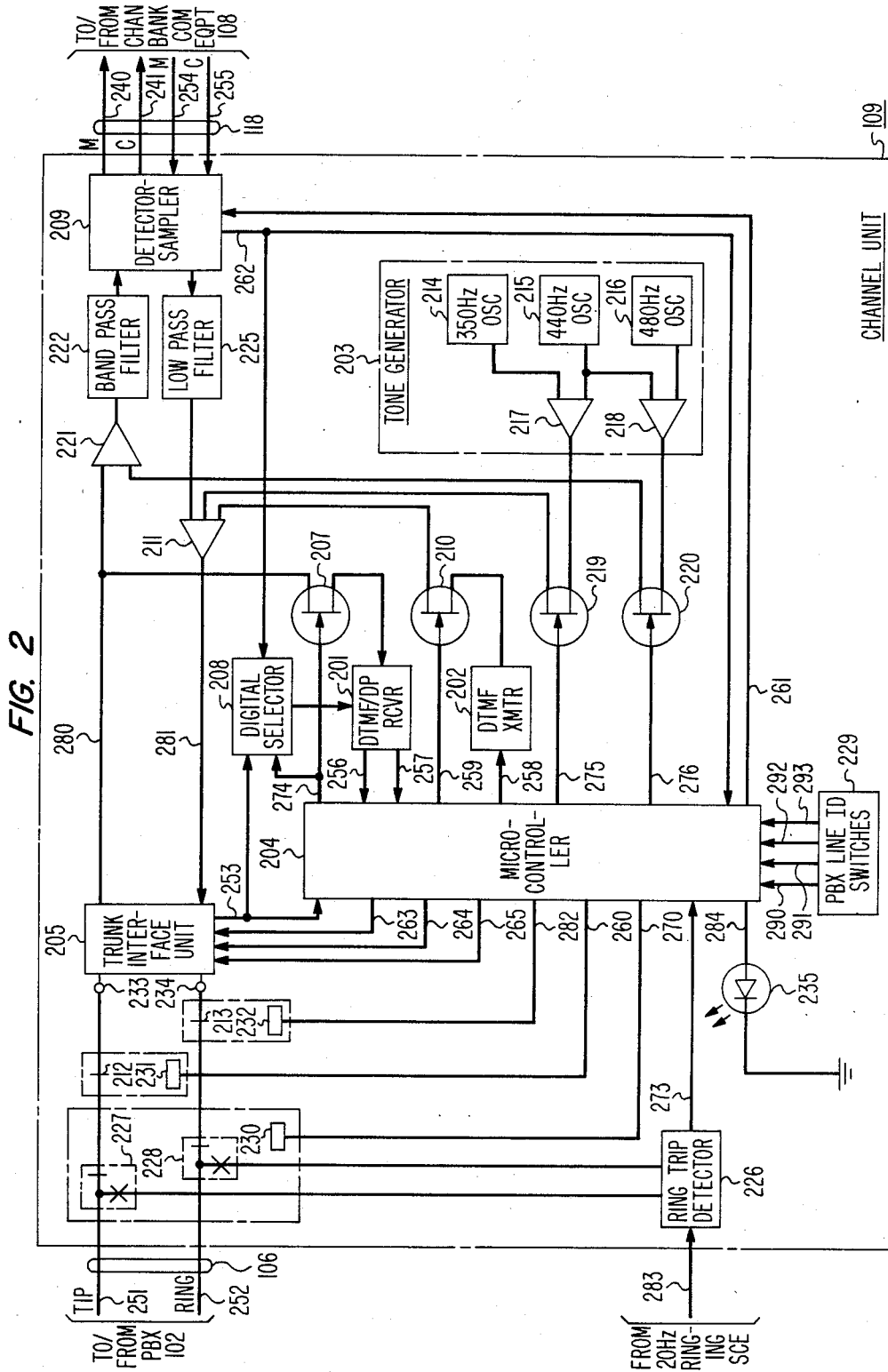
FIG. 2 shows a block diagram of the channel unit of the multiplex terminal which directly interconnects the digital toll office to a private branch exchange (PBX)

Depicted in FIG. 2 is channel unit 109 which directly interconnects PBX line 106 and toll office line 118 without a local end office interconnection. PBX line 106 is a two-wire communication line comprising TIP and RING conductors 251 and 252 that conduct both message and control signals between the channel unit and PBX 102. Toll office line 118 is a four-wire communication line comprising separate transmit and receive pulse amplitude modulated (PAM) signal buses 240 and 254 for exchanging voice-frequency message and control signals between the channel unit and common equipment 108. Toll office line 118 also includes transmit and receive control signal buses 241 and 255 for exchanging digital supervisory and address control signals between the channel unit and the common equipment. The common equipment multiplexes the control signals into the digital bit stream to the toll office and demultiplexes the control signals out of the digital bit stream from the toll office.

Channel unit 109 includes trunk interface unit 205 for exchanging signals between the channel unit and PBX line 106 and further includes detector-sampler 209 for exchanging signals between the channel unit and toll office line 118. Trunk interface unit 205 performs two-wire to four-wire conversion between two-wire TIP and RING conductors 251 and 252 and four-wire transmit and receive paths 280 and 281. Analog message signals on transmit path 280 are passed through summing circuit 221 and bandpass filter 222 to detector-sampler 209. In response to timing signals from common equipment 108, detector-sampler 209 samples the analog message signal and sends pulse amplitude modulated samples to channel bank common equipment on transmit PAM signal bus 240. In the opposite direction, the detector-sampler detects PAM samples for the channel unit from a multiplexed signal on receive PAM signal bus 254. Low pass filter 225 then filters the PAM samples to form an analog message signal that is passed through summing circuit 211 for transmission to the trunk interface unit on receive path 281.

In addition to two-wire to four-wire conversion, trunk interface unit 205 provides limited current battery-feed and loop-closure detection and converts the different types of d.c. electrical interface signals on the PBX line such as loop, loop reverse-battery, loop start, and ground start signals as will be described hereinafter. Similarly, detector-sampler 209 converts the supervisory and address electrical interface control signals exchanged between the toll office line and the channel unit.

Channel unit 109 also comprises combination dual-tone multifrequency (DTMF) or dial pulse (DP) address signal receiver 201, DTMF address signal transmitter 202, and combination dial tone and audible ringing tone signal generator 203 all under the control of stored program-controlled microcontroller 204.

Combination DTMF/DP receiver 201 collects dial pulse address signals from the PBX through trunk interface unit 205, loop closure lead 253 and digital selector 208. Receiver 201 collects dial pulse address signals from the toll office through detector-sampler 209, conductor 262, and digital selector 208. Responsive to a select signal on conductor 274 from microcontroller 204, digital selector 208 causes the dial pulse address signals from either the toll office or PBX to be sent to receiver 201. The receiver also collects analog dual-tone multifrequency address signals from the PBX through trunk interface unit 205, transmit path 280, and analog switch 207. Analog switch 207 sends the analog address signals to DTMF/DP receiver 201 in response to the select signal on conductor 274 from microcontroller 204. The DTMF/DP receiver is a well-known and commercially device and is available from the Western Electric Company as the Model 801A single chip receiver.

Receiving an address control signal from either toll office 101 or PBX 102, receiver 201 performs well-known intradigit as well as interdigit timing to verify the receipt of a valid address digit. When a valid address digit is received, receiver 201 interrupts microcontroller 204 via a valid digit interrupt signal on lead 256 and sends a binary coded decimal (BCD) representation of the address digit to the microcontroller on input bus 257.

Dual-tone multifrequency (DTMF) transmitter 202, such as National's MM53130 single chip DTMF generator, sends DTMF address signals to the PBX under the control of the microcontroller. Microcontroller 204 sends a BCD encoded address digit signal on output bus 258 to the DTMF transmitter. The transmitter then generates a tone pair representative of the address digit and sends this tone pair to receive path 281 of trunk interface unit 205 through analog switch 210. The DTMF tone pair is introduced into the receive path of the trunk interface unit via analog summing circuit 211. The duration of this tone pair is controlled by a DTMF control signal on conductor 259 to analog switch 210.

The trunk interface unit then passes the DTMF address signal to the tip and ring leads of the PBX.

Dial pulse address signals are sent to the PBX with the use of relay "break" contacts 212 and 213 connected serially in respective TIP and RING leads 251 and 252. For each address digit, microcontroller 204 sends a control signal representative of a dial pulse address digit to relays 231 and 232 via respective control winding leads 260 and 282. In response, relay contacts 212 and 213 open and close the PBX loop. Microcontroller 204 also sends dial pulse address signals to the toll office via detector-sampler 209. These high and low logic level dial pulse address signals having a typical pulse rate of 16 pulses per second are sent to the detector-sampler via transmit signaling lead 261. Detector-sampler 209 converts the dial pulse address signal into well-known "A" and "B" signaling bits that are sent to common equipment 108 via transmit control signal bus 241.

All supervisory as well as address signals exchanged between the toll office and the PBX are controlled by microcontroller 204. Supervisory control signals representative of the state of a call on the toll office line are received by detector-sampler 209 and sent to the microcontroller 204 on conductor 262 as a series of high and low logic levels. The high and low logic levels represent the "on-hook" and "off-hook" conditions of the toll office line, respectively. Detector-sampler 209 converts the "A" and "B" electrical interface signaling bits received on receive control signal bus 255 from channel bank common equipment 108 to the high and low logic level control signal.

Dependent on the type of PBX line, microcontroller 204 also sends control signals on control leads 263 through 265 to the trunk interface unit 205 to advance the call on the PBX line to a state that is equivalent to the state of the call on the toll office line. In the opposite direction, supervisory electrical interface signals from the PBX are sent to microcontroller 204 on loop closure lead 253 from the trunk interface unit 205. Microcontroller 204 sends supervisory control signals to the detector-sampler 209 on conductor 261.

Dial tone and audible ringing tone generator 203 comprises oscillators 214 through 216, each generating a single frequency. These single frequencies are then combined in pairs through analog summing circuit 217 and 218 to send either audible ringing tone to the toll office or dial tone to the private branch exchange. For example, 440 and 480 hertz signals from oscillators 215 and 216 are combined by summing circuit 218 to form audible ringing tone for the toll office 101. Audible ringing tone is applied to the toll office transmit path through analog switch 220 and summing circuit 221. Similarly, 350 and 440 hertz frequencies from oscillators 214 and 215 are combined by summing circuit 217 to form dial tone for PBX 102. Dial tone for PBX 102 is applied to receive path 281 through analog switch 219 and summing circuit 211. In response to a control signal on conductor 276 from the microcontroller, analog switch 220 selectively applies audible ringing tone to the transmit toll office path. In response to a control signal on conductor 275 from the microcontroller, analog switch 219 sends dial tone to the receive port of the trunk interface unit which passes the dial tone to the tip and ring leads of the PBX.

Channel unit 109 also comprises ring-trip detector 226, PBX line identification switches 229, and fault indicator 235. The ring-trip detector is a well-known circuit for applying a common 20-hertz power ringing signal to PBX TIP and RING leads 251 and 252 through two pairs of transfer contacts 227 and 228, respectively. Ring-trip detector 226 receives the ringing signal on conductor 283 that is connected to a power ringing source. Microcontroller 204 controls the application of the ringing signal to the PBX tip and ring leads via control lead 270 and relay 230. When operated, relay 230 opens the "break" contacts and closes the "make" contacts of transfer contacts 227 and 228. With power ringing applied, ring-trip detector 226 senses an "off-hook" or "closed loop" condition when a low impedance is applied across the tip and ring leads. When the answer signal is detected by ring-trip detector 226, it signals microcontroller 204 via control lead 273 to deactivate relay 230.

Prior to connecting the channel unit to the toll office and PBX lines, PBX line identification switches 229 are manually operated to indicate to the microcontroller the identity of the particular type of PBX line. Since the channel unit can interface the toll office line with any one of a number of different PBX lines, these switches are used to identify the particular type of supervisory and address electrical interface signals along with the necessary signaling protocol for the desired PBX line. These switches are connected to the microcontroller via input control leads 290 through 293 to identify the supervisory and address electrical interface signals utilized by the identified PBX line. When the channel unit is connected to the toll office and PBX lines, the microcontroller stores this information in a memory for subsequent operation.

Fault indicator 235, such as a light-emitting diode, is connected to microcontroller 204 via output control lead 284 to indicate various fault conditions such as a power failure or signaling irregularity.

Figure 3:
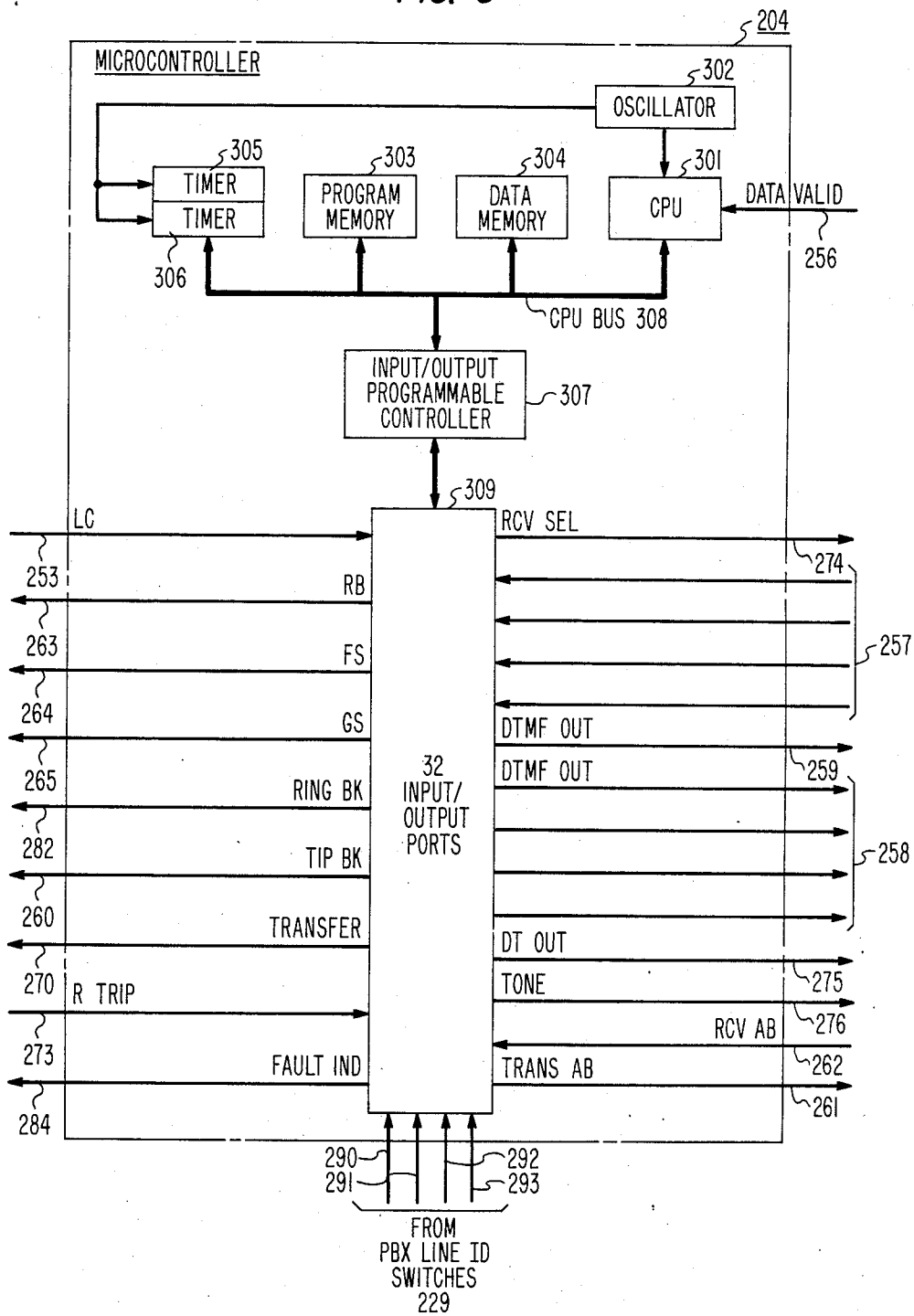
FIG. 3 shows a more detailed block diagram of the microcontroller of the channel unit in FIG. 2.

Depicted in FIG. 3 is a block diagram of microcontroller 204 which comprises central processing unit 301, oscillator 302, program memory 303, data memory 304, timers 305 and 306, and programmable input-output controller 307 which are all interconnected by address-data bus 308. All of the units of the microcontroller are well-known and commercially available devices such as members of the Intel 8051 microcomputer family. Microcontroller 204 is the processing unit of channel unit 109 and performs three basic operations; namely, it interfaces the different signaling protocols such as wink start and immediate start operation of the PBX and toll office lines; it controls the conversion of different address signals such as dual-tone multifrequency to dial pulse, dial pulse to dual-tone multifrequency, or dial pulse at one pulse rate to dial pulse at another pulse rate from one line to the other; and it controls the application of call progress signals such as dial tone, power ringing, and audible ringing tone to the two lines.

Central processing unit 301 is the information processing unit of the microcontroller and executes the program instructions stored in program memory 303.

Oscillator 302 interfaces with timers 305 and 306 which provide timing for the supervisory and address control signals.

Program memory 303 is a permanent memory such as programmable read-only memory (PROM) and stores program instructions which direct central processing unit 301 to sequentially perform its many functions. Included in these program instructions are well-known algorithms for converting one type of signaling protocol to any other signaling protocol. Also included are additional well-known algorithms for address signal conversions.

Figure 6:
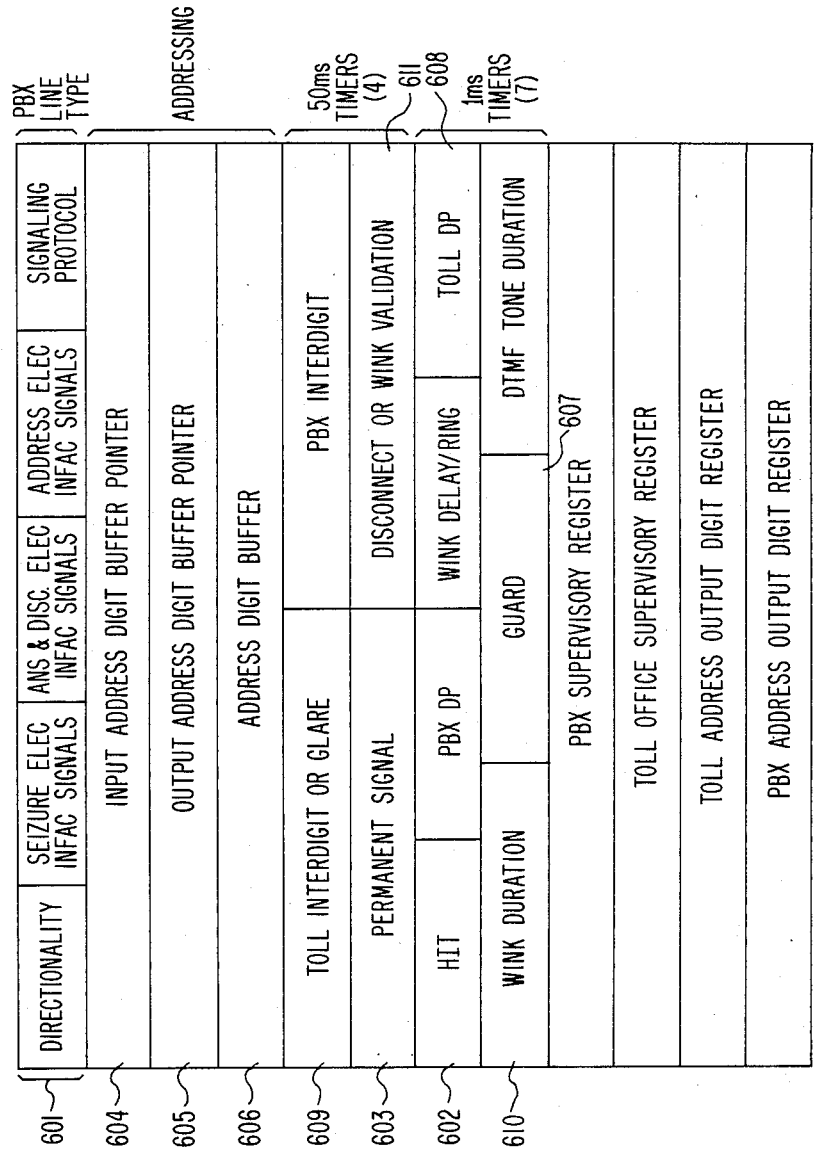
FIG. 6 shows the layout of the data memory in the microcontroller in FIG. 3.

Data memory 304 is a temporary and erasable memory such as a random access memory (RAM) for storing information related to supervisory and address signal conversions. The data memory is segmented to store a plurality of variables such as to perform these conversions. Depicted in FIG. 6 is the layout of data memory 304 which is segmented to store PBX line type information. PBX line type information includes the directionality of the PBX line; the type of electrical interface signals for seizure supervision, answer and disconnect supervision, and address digits; and the signaling protocol. Also included in the memory are input and output pointers which control the loading and unloading of address digits from an address digit buffer. Additionally, the data memory includes eleven software timers, four with 50 millisecond increments and seven with one millisecond increments. These software timers are incremented by respective hardware timers 305 and 306 and are used to perform various timing functions as will be described hereinafter. Data memory further comprises several software registers to store supervisory control signals indicative of the state of the call on the toll office and PBX lines as well as address digits from the address digit buffer that will be sent to the toll office and PBX.

Input-output controller 307 and parallel input-output ports 309 are used to control and monitor the various units of the channel unit. Each port may be programmed to perform either an input or an output function. The input and output ports are connected to the various units of the channel unit as shown in FIG. 3.

Figure 4:
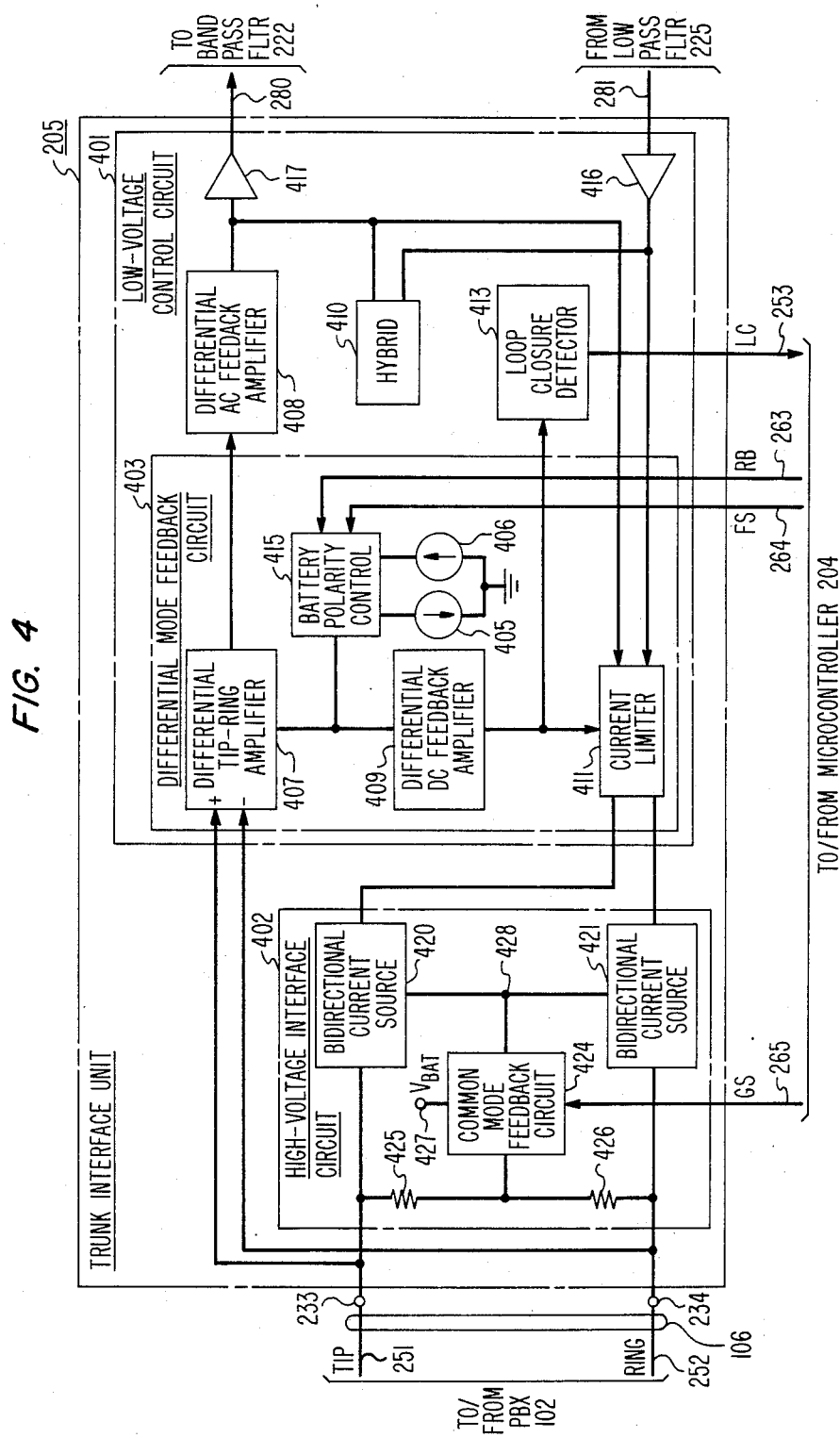
FIG. 4 shows a more detailed block diagram of the trunk interface unit of the channel unit in FIG. 2.

Depicted in FIG. 4 is a block diagram of trunk interface unit 205 for exchanging message and control signals between the channel unit and PBX. The trunk interface unit is a transformerless battery-feed circuit that performs loop start, ground start, loop, and loop reverse-battery signaling; two-wire to four-wire conversion; and PBX loop closure detection. Trunk interface unit 205 comprises low-voltage control circuit 401 and high-voltage interface circuit 402. The high-voltage interface circuit provides bidirectional current sources for PBX line 106 via the tip and ring leads. The low-voltage control circuit performs two-wire to four-wire conversion between PBX line 106 and transmit and receive paths 280 and 281 and provides PBX loop closure detection for microcontroller 204. The trunk interface unit is disclosed in U.S. Pat. No. 4,476,350 of D. W. Aull et al., entitled "Battery Feed Circuit", issued Oct. 9, 1984, which may be referred to for a more comprehensive understanding of the construction and operation of the trunk interface unit.

In response to control signals from the microcontroller on conductors 263 through 265, the trunk interface unit applies various combinations of battery polarity and impedances to tip and ring terminals 233 and 234. In addition, the interface unit sends a loop closure (LC) control signal on conductor 253 to the microcontroller when current in a particular direction is detected flowing in the tip and ring leads. The reverse battery (RB) control signal on lead 263 controls the polarity of the battery applied to tip and ring terminals 233 and 234. When the RB control signal is inactive, the interface unit applies "normal battery", such as −48 VDC to the ring lead and ground to the tip lead. When the RB control signal is active, the trunk interface unit applies "reverse battery". That is, −48 VDC is applied to the tip lead, and the ring lead is grounded. An active feed shutdown (FS) control signal on lead 264 from the microcontroller causes the trunk interface unit to present a low impedance termination such as 300 ohms with "zero battery" applied to tip and ring terminals 233 and 234. That is, one-half the talking battery potential (approximately −24 VDC) is applied to each of the tip and ring terminals. When the FS control signal is active, the RB control signal is inhibited from controlling the battery polarity, but still controls the direction that current is detected in the tip and ring lead loop.

An active ground start (GS) control signal on lead 265 from the microcontroller causes the trunk interface unit to apply −48 VDC to the ring lead for ground start signaling. Tip "break" contacts 212 are opened so as to allow the interface unit to detect current flowing in the ring lead when the PBX line is seized.

High-voltage interface circuit 402 comprises controlled bidirectional current sources 420 and 421 that couple voice-frequency and battery-feed current to tip and ring lead terminals 233 and 234, respectively. The magnitude of this current is regulated by balanced control signals on conductors 451 and 452 from low-voltage control circuit 401 which monitors the differential voltage between the tip and ring leads. Interface circuit 402 further comprises common-mode feedback circuit 424 that presents a low common-mode impedance to the tip and ring leads via respective feedback resistors 425 and 426. A source of potential such as −24 VDC (one-half of battery potential) is applied to power terminal 427. Circuit node 428 interconnects the feedback circuit and bidirectional current sources. The high-voltage interface circuit is described in an article by D. W. Aull, et al., entitled "A High Voltage IC for a Transformerless Trunk and Subscriber Line Interface" in the *IEEE Journal of Solid State Circuits,* Volume SC-16, Number 4, August, 1981.

The low-voltage control circuit comprises differential-mode feedback circuit 403, a.c. feedback amplifier 408, hybrid 410, loop closure (LC) detector 413, receive amplifier 416, and transmit amplifier 417 connected as shown to transmit and receive paths 280 and 281, TIP and RING leads 251 and 252, and high-voltage. interface circuit 402. Low-voltage control circuit 401 controls the operation of the trunk interface unit through an a.c. and a d.c. feedback loop. Furthermore, differential-mode feedback circuit 403 comprises current sources 405 and 406, differential tip-ring amplifier 407, differential d.c. feedback amplifier 409, current limiter 411, and battery polarity control circuit 415. The a.c. feedback loop consists of high-voltage interface circuit 402, differential tip-ring amplifier 407, differential a.c. feedback amplifier 408, and current limiter 411. The d.c. feedback loop consists of high-voltage interface circuit, differential tip-ring 407, differential d.c. feedback amplifier 408, and current limiter 411. The low-voltage control circuit is described in an article by D. W. Aull, et al., entitled "A Hybrid Integrated Trunk and Subscriber Line Interface" in *IEEE, ISSCC Digest of Technical Papers,* February, 1982.

In response to incoming signals on receive path 281, receive amplifier 416 passes the incoming message signals to hybrid 410 and into the a.c. feedback loop via current limiter 411. Current limiter 411 sums the d.c. and a.c. feedback signals and the incoming signal into differential currents that are sent to the high-voltage circuit as balanced control signals on lead 451 and 452.

Two-wire to four-wire hybrid 410 is configured by matching a transfer function from the output of differential a.c. feedback amplifier 408 through current limiter 411 and high-voltage circuit 402, and then back to the output of differential a.c. feedback amplifier 408. The hybrid provides a balanced network that automatically matches termination impedances.

Transmit amplifier 417 subtracts the output signals from the differential a.c. feedback amplifier and hybrid for transmission on transmit path 280.

Connected to the tip and ring leads, differential tip-ring amplifier 407 provides an output voltage that represents the voltage developed by the current from current sources 420 and 421 along with any a.c. voltage representing the message signals on the tip and ring leads. The a.c. voltage is coupled to transmit path 280 via amplifiers 408 and 417. Differential tip-ring amplifier 407 is also coupled to differential d.c. feedback amplifier 409. Differential a.c. feedback amplifier 408 establishes the a.c. input impedance of the interface which is directly proportional to the impedance between the output of amplifier 407 and the input of amplifier 408.

Differential d.c. feedback amplifier 409 provides one of three gains depending on the value of the output voltage from differential tip-ring amplifier 407. This variation in gain alters the gain of current limiter 411 and, therefore, the magnitude of the control signals on leads 451 and 452 to provide a non-linear battery feed profile.

The input of differential d.c. feedback amplifier 409 is also coupled to battery polarity control circuit 415 and current source 405. Current source 405 is less than battery voltage to ensure that bidirectional current sources 420 and 421 remain properly biased. That is, they do not saturate when an open circuit condition is presented across the tip and ring leads, and no feed current is generated.

Battery polarity control circuit 415 is controlled by the feed shutdown (FS) control signal and the reverse battery (RB) control signal on respective leads 263 and 264 from the microcontroller. When the RB and FS control signals are inactive, battery polarity control circuit couples current source 405 to differential d.c. feedback amplifier 409. This causes a "normal battery" condition with the tip lead grounded and a negative voltage such a −48 VDC on the ring lead. When the RB control signal is active, current source 406 is coupled to the differential d.c. feedback amplifier 409 causing a "reverse battery" condition on the tip and ring leads. Current source 406 is identical to current source 405 except for a reversal of polarity. Current source 406 reverses the polarity of the control signals on leads 451 and 452 to the high-voltage interface circuit 402. As a result, the "normal battery" current flow is reversed. The "reverse battery" current is equal and opposite to the "normal battery" current. The "reverse battery" condition is needed for signaling when TIP and RING leads 251 and 252 are connected to a PBX instead of a customer station set such as 117. In some PBX line applications, feed current is not required. In such cases, an active FS control signal causes battery polarity control circuit 415 to provide an open circuit termination to differential d.c. feedback amplifier 409 resulting in a feed shutdown profile. The feed shutdown profile controls the removal of −48 V battery from the tip and ring leads causing the trunk interface unit to appear as a low-impedance termination with the tip and ring leads at one-half the talking battery potential (approximately −24 VDC). The RB control signal from the microcontroller is then inhibited from controlling battery polarity, but as mentioned still controls the direction that loop closure detector 413 detects current.

The loop closure (LC) control signal on lead 253 is a two-level logic signal that is sent to the microcontroller. A change in the level of the LC control signal is generated by a predetermined change in the magnitude of the voltage. This predetermined change, typically 3 volts, is indicative of dial pulsing and/or an "off-hook" condition on PBX loop 106. Detector 413 comprises a comparator that generates an "off-hook" logic level signal when the output of differential d.c. feedback amplifier 409 exceeds a fixed threshold. When the FS control signal is active, loop closure detector 413 detects when current flows in the "zero battery" resistive termination condition such as 300 ohms. The direction in which current is detected depends on the level of the RB control signal.

The ground start (GS) control signal in lead 265 is also a two-level logic signal from microcontroller 204. Active GS control signal causes the trunk interface unit 205 to enter a ground start mode. This mode is used for ground start signaling. The GS control signal disables the common-mode feedback circuit which causes −48 VDC to be applied to the ring lead. In this mode, the microcontroller normally causes tip "break" contacts 212 to open. Thus, the PBX can ground the ring lead to seize the PBX line. Loop closure detector 413 functions as a ground detector in this mode. When the microcontroller 204 causes tip "break" contacts 212 to close in response to the PBX grounding the ring lead, the tip lead is grounded causing the PBX to close the tip-ring loop.

Figure 5:
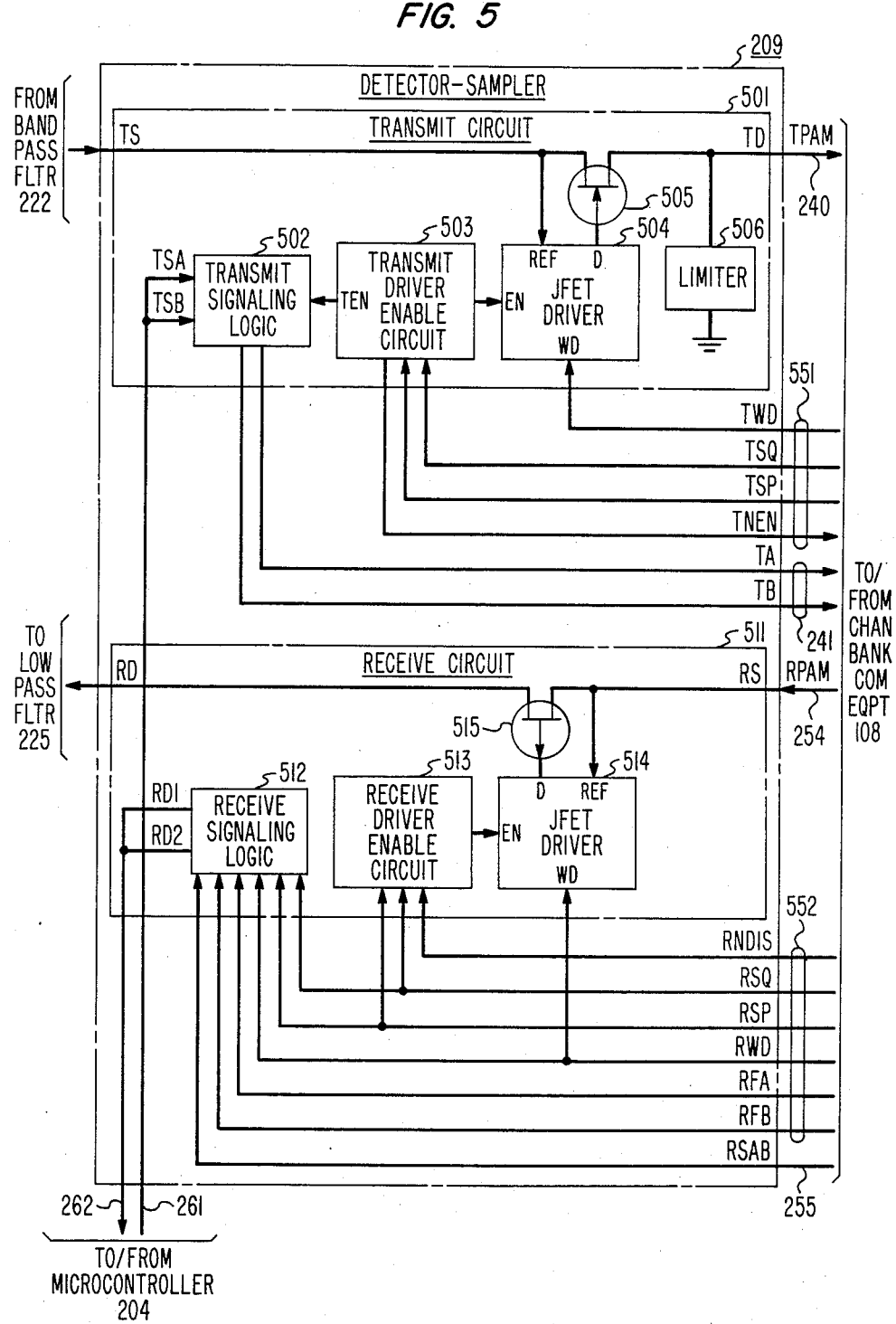
FIG. 5 shows a more detailed block diagram of the detector-sampler of the channel unit in FIG. 2.

Depicted in FIG. 5 is a block diagram of detector-sampler 209. The detector-sampler interfaces the message and control signals exchanged between the channel unit and common equipment. Detector-sampler 209 comprises transmit circuit 501 and receive circuit 511. Under the control of common equipment 108, transmit circuit 501 samples the band-limited analog control and message signals received from bandpass filter 222. The pulse amplitude modulated (PAM) samples are then sent on transmit PAM signal bus 240 to the common equipment during transmit time slots designated for the channel unit. In addition, transmit circuit 501 periodically stores the "on-hook" and "off-hook" logic levels of the control signal on lead 261 from the microcontroller and then sends the stored logic level control signal on transmit signal bus 241 to the common equipment during signaling bit time slots also designated for the channel unit. Common equipment 108 encodes and multiplexes the message and control signals from all the channel units and then transmits the multiplexed pulse code modulated (PCM) signals on digital carrier facility 105 to toll office 101.

During receive time slots designated for the channel unit, receive circuit 502 receives PAM message and analog control signal samples on receive PAM signal bus 254 from the common equipment and passes these samples to low-pass filter 225. In response to well-known "A" and "B" signaling bits on receive signal bus 255 from the common equipment during designated time slots, the receive circuit stores the signaling bit and then sends a corresponding "on-hook" or "off-hook" level control signal on conductor 262 to the microcontroller.

Transmit circuit 501 comprises transmit signaling logic 502, transmit driver enable circuit 503, junction field-effect transistor (JFET) driver 504, JFET 505, and limiter 506 interconnected as shown to microcontroller 204, bandpass filter 222, transmit PAM signal bus 240, and transmit control signal bus 241. Common equipment 108 controls the transmit circuit via enable, address, and timing leads 551. Similarly, receive circuit 511 comprises receive signaling logic 512, receive driver enable 513, JFET driver 514, and JFET 515 interconnected as shown to microcontroller 204, low pass filter 225, receive PAM signal bus 254, and receive control signal bus 255. The common equipment also controls the receive circuit via disable, address and timing leads 552.

The detector-sampler is disclosed in an article by J. H. Green et al., entitled "A Channel Unit Signal Controller for Shared Codec D-Type Channel Banks", in the *IEEE Journal of Solid-State Circuits,* Vol. SC-16, No. 4, August 1981, and in an article by R. M. Goldstein, entitled "Custom-Integrated Circuits for Digital Terminals", in *The Bell System Technical Journal,* Vol. 61, No. 9, Part 3, November, 1982. The reader is referred to these and other articles in the same *Bell System Technical Journal* for a more comprehensive understanding of the construction and operation of the detector-sampler and need not be fully described herein to understand the present invention.

As previously mentioned, microcontroller 204 performs three basic operations; namely, it interfaces the different signaling protocols such as wink start and immediate start operation of the PBX and toll office lines; it controls the conversion of different address signals such as dual-tone multifrequency to dial pulse, dial pulse to dual-tone multifrequency, or dial pulse at one pulse rate to dial pulse at another pulse rate from one line to the other; and it controls the application of call progress signals such as dial tone, power ringing, and audible ringing tone to the two lines. All of these microcontroller operations are controlled by program instructions that are stored in program memory 303 and direct central processing unit 301.

Associated with each toll office and private branch exchange line is a set of signaling characteristics that identifies the type of supervisory, address, and call progress electrical interface signals along with a signaling protocol that are utilized to originate and advance a call on the line from one state to another. The signaling protocol of each line is the set of control signals or the various series of electrical interface signals, usually with respect to time, that are exchanged on the line to advance a call thereon from one call state to another such as from "idle" to "seized", "talk" to "disconnect", etc. However, with such a large variety of different PBX line characteristics, the control signals on the PBX line are typically not useable by the toll office line and vice versa.

In accordance with this invention, the channel unit interfaces the different signaling characteristics and, in particular, the different signaling protocols of the PBX and toll office lines. By way of example, the signaling characteristics of a two-way digital T-1 carrier channel line between the channel unit and the toll office are commonly identified as four-wire E & M supervisory signaling with dial pulse address signaling. In addition, the signaling protocol of the incoming toll office line may be characterized as having immediate start operation, whereas the signaling protocol of the outgoing toll office line may be characterized as having wink start operation. The PBX line between the channel unit and the private branch exchange may be characterized by any number of different signaling characteristics. By way of example, a two-way, two-wire PBX line may have ground start seizure supervisory signaling and loop answer and disconnect supervisory signaling with immediate start operation in both the incoming and outgoing directions. In addition, address signaling may be dual-tone multifrequency and dial pulse address signaling. As is obvious, it is necessary for the channel unit to interface the different signaling characteristics of the PBX and toll office lines.

Listed in the following TABLE A are the characteristics of three types of two-wire private branch exchange lines. Each type of PBX line has a different directionality such as one-way outgoing, one-way incoming, and two-way. For each direction, two types of supervisory electrical interface signals, one type of address electrical interface signals, and a signaling protocol are provided. The illustrative embodiment of the invention implements the listed signaling characteristics; however, any number of additional combinations of supervisory, address, and call progress electrical interface signals and signaling protocols may be implemented.

TABLE A

PBX Line Types

Figure 7:
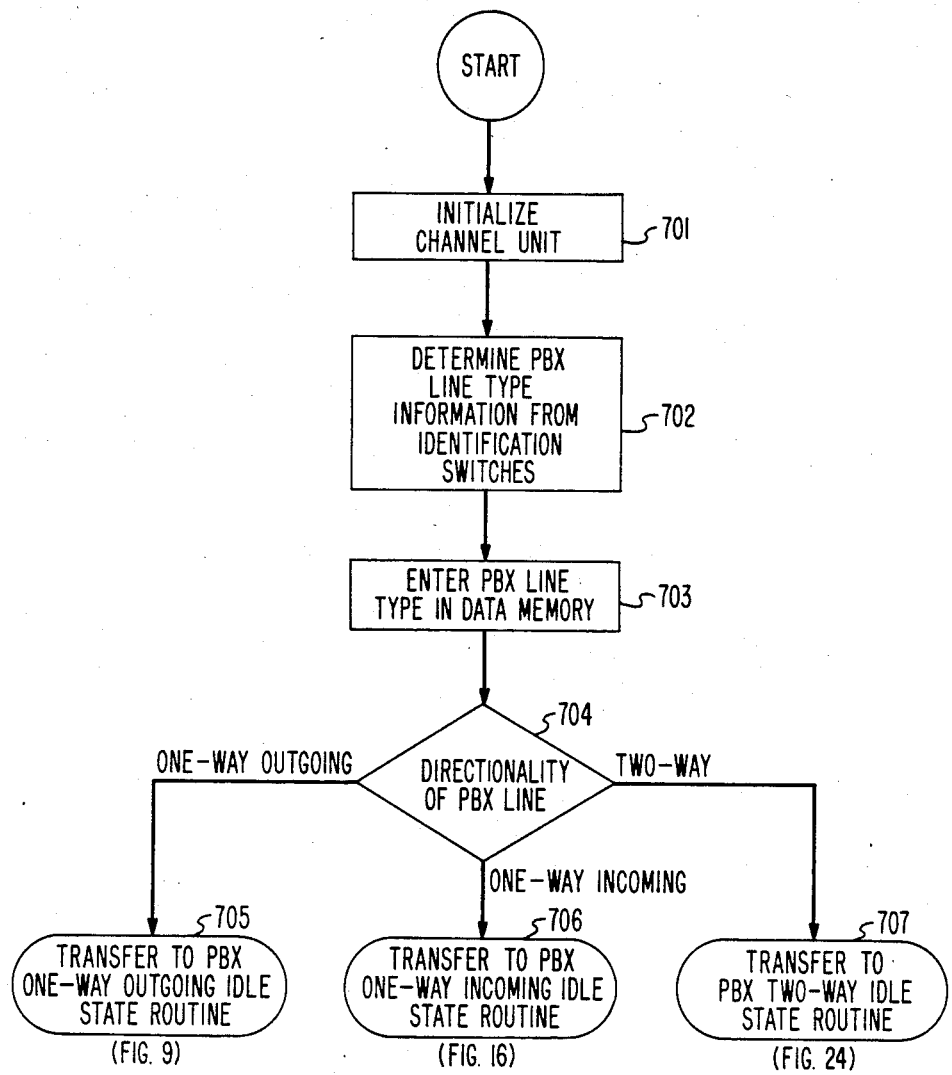
FIG. 7 shows a flow diagram of the INITIALIZATION ROUTINE which is used to initialize the circuits of the channel unit when power is applied.

ONE-WAY OUTGOING
    Immediate Start Operation
    Dual-Tone Multifrequency Address Signaling
    Ground Start Seizure Supervisory Signaling
    Loop Answer and Disconnect Supervisory Signaling ONE WAY INCOMING
    Immediate Start Operation
    Dial Pulse Address Signaling
    Loop Start Seizure Supervisory Signaling
    Loop Reverse Battery Answer and Disconnect Supervisory Signaling TWO-WAY
  A. Outgoing
    Immediate Start Operation
    Dial Pulse Address Signaling
    Ground Start Seizure Supervisory Signaling
    Loop Answer and Disconnect Supervisory Signaling
  B. Incoming
    Immediate Start Operation
    Power Ringing Call Progress Signaling
    Ground Start Seizure Supervisory Signaling
    Loop Answer and Disconnect Supervisory Signaling Before power is applied to channel unit 109, PBX line identification switches 229 on the channel unit are manually operated to identify the particular type of PBX line. When power is applied, channel unit 109 executes an INITIALIZATION ROUTINE which is depicted in FIG. 7. Under the control of this routine, central processing unit 301 inhibits all interrupt signals and in a well-known manner initializes all the circuits of the channel unit to a known state or condition (block 701). Next, the central processing unit determines the PBX line type from the PBX line identification switches 229 (block 702) and enters this information in PBX line type memory location 601 of data memory 304 (block 703). As shown in FIG. 6, the PBX line type information includes the directionality of the PBX line; the type of electrical interface signals used for seizure supervisory signaling, answer and disconnect supervisory signaling, and address signaling; and the signaling protocol of the PBX line. Depending on the directionality of the PBX line (block 704), control of the microcontroller is transferred to one of three routines: PBX ONE-WAY OUTGOING IDLE STATE ROUTINE (block 705), PBX ONE-WAY INCOMING IDLE STATE ROUTINE (block 706), or PBX TWO-WAY IDLE STATE ROUTINE (block 707).

Supervisory electrical interface signals represent the "on-hook" and "off-hook" conditions of the line. A seizure control signal comprising a particular pattern or series of line seizure supervisory electrical interface signals, such as well-known loop start or ground start signals, is used to indicate when a calling station originates a call on the PBX line. Answer and disconnect control signals comprising different patterns or series of answer and disconnect supervisory electrical interface signals, such as well-known loop and loop reverse-battery, are used to indicate when the called party answers the call and when either the calling or called party "hangs up" the receiver, thereby disconnecting the call.

Address control signals are typically either well-known dial pulse or dual-tone multifrequency electrical interface signals that represent address digits. Like supervisory signals, dial pulse address electrical interface signals represent the "on-hook" and "off-hook" or, more particularly, the "open" and "closed" loop conditions of the line; however, dial pulse address signals usually have shorter "on-hook" and "off-hook" pulse durations. A particular series of dial pulse signals represents the address digit.

As previously mentioned, the signaling protocol of the PBX line is the set of control signals or the various series of electrical interface signals that are exchanged on a line to cause the call thereon to advance from one call state to another. Some call state transitions may require the exchange of only one control signal; whereas other call state transitions may require a number of control signals to be exchanged back and forth between the PBX and the channel unit. For example, with a one-way incoming PBX line with well-known immediate start operation, the PBX line need only be seized before address digits are sent to the PBX. With well-known wink start operation, a "seized" PBX line will return a wink signal before the channel unit sends any address digits. When a one-way outgoing toll office line with wink start operation is connected by the channel unit to a PBX line with immediate start operation, the signaling protocols of the two lines are incompatible. That is, the toll office line will not send an address digit to the PBX until a wink signal is returned. In accordance with one feature of this invention, the "seized" channel unit interfaces the different signaling protocols by, for example, generating and returning a wink signal to the toll office. The signaling protocol of a line not only includes supervisory control signals, but address and call progress control signals as well.

Figure 8:
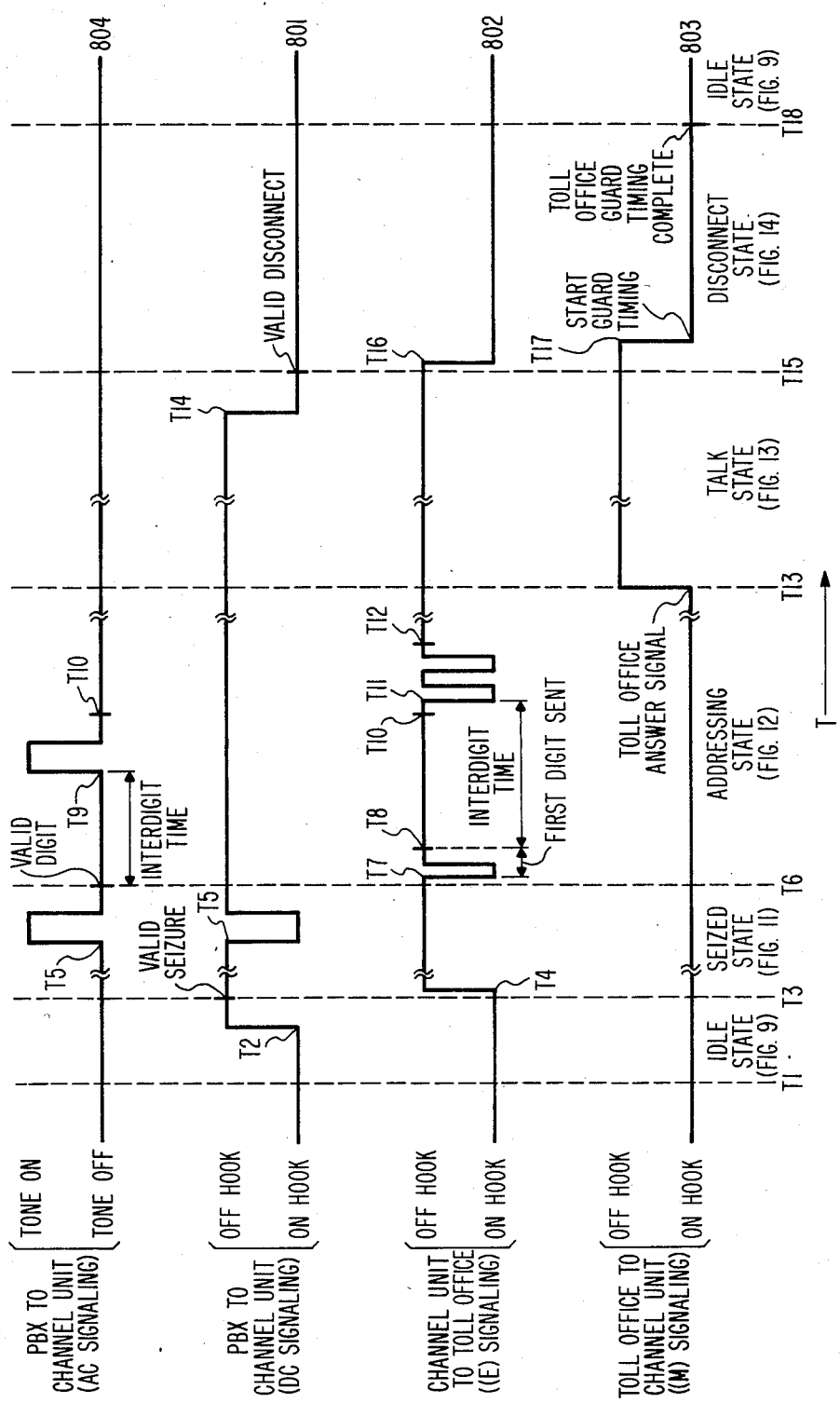
FIG. 8 is a timing diagram of the control signals used to advance the state of a call on a one-way outgoing PBX line and a one-way incoming toll office line.

The operation of an illustrative channel unit for interconnecting a two-wire, one-way outgoing PBX line with ground start seizure supervisory signaling, loop answer and disconnect supervisory signaling, and dual-tone multifrequency address signaling and a four-wire, one-way incoming toll office line with E and M supervisory and address signaling may be better understood with reference to the timing diagram of FIG. 8 and the flow diagrams of FIG. 9 through 14.

Depicted in the timing diagram of FIG. 8 is a graphical representation of idealized PBX to channel unit d.c. control signal 801, channel unit to toll office control signal 802, toll office to channel unit control signal 803, and PBX to channel unit a.c. control signal 804 that are all plotted with respect to time. Idealized PBX to channel unit d.c. control signal 801 has two logic levels and is sent on loop closure lead 253 from trunk interface unit 205 to microcontroller 204 and digital selector 208. As previously described, the trunk interface unit converts the different d.c. supervisory and address electrical interface signals from the PBX to the two logic levels of PBX control signal 801 that represent the "on-hook" and "off-hook" conditions of the PBX line. Idealized channel unit to toll office and toll office to channel unit control signals 802 and 803 also have two logic levels that are exchanged on respective leads 261 and 262 between the microcontroller and detector-sampler 209 and that represent the "on-hook" and "off-hook" conditions of the toll office line. The "on-hook" and "off-hook" logic levels of channel unit to toll office control signal 802 are converted to d.c. supervisory and address electrical interface signals by detector-sampler 209 for transmission to the toll office. Similarly, the d.c. supervisory and address electrical interface signals from the toll office line are converted by detector-sampler 209 to the "on-hook" and "off-hook" logic levels of toll office to channel unit control signal 803. PBX to channel unit a.c. control signal 804 on trunk interface unit receive path 281 has "tone-off" and "tone-on" levels that represent the absence and presence of dual-tone multifrequency address signals to the PBX, respectively. Each dual-tone multifrequency address signal represents a particular address digit ranging in value, for example, from zero to nine. As shown, various segments of control signals 801 through 804 indicate the state of a call at any given time on the PBX and toll office lines, such as "idle", "seized", "addressing", "talk", and "disconnect". For ease of understanding, the call state of the line and the call thereon may be used interchangeably, although it is to be understood that it is the different electrical interface signals and signaling protocol of each line that are used to advance the call on the line from one state to another. For example, at time T1, control signals 801–803 are all at a logic level representative of the "on-hook" condition of the PBX and toll office lines, and control signal 804 is at a level representative of the absence of DTMF tone from the PBX. Thus, the call on both lines is in a well-known "idle" state. When the lines are in the "idle" call state, channel unit 109 is under the control of an "idle" state routine.

Figure 9:
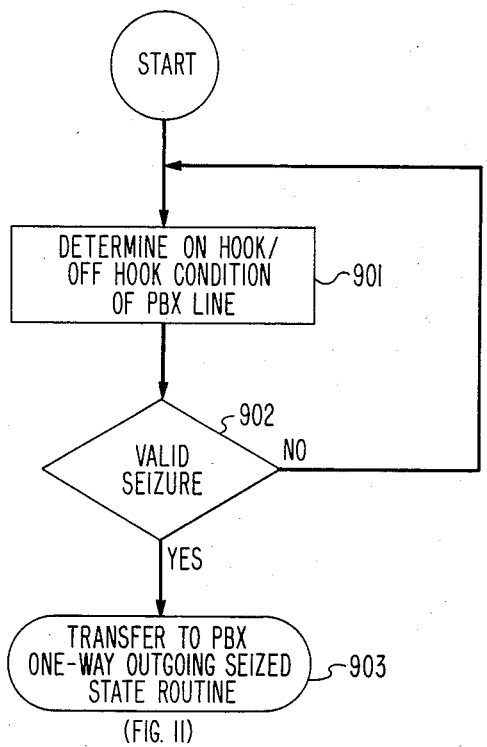
FIGS. 9 through 14 show the detailed flow diagrams of the routines, used by the channel unit to advance the state of a call on a one-way outgoing PBX line and a toll office line.
Figure 11:
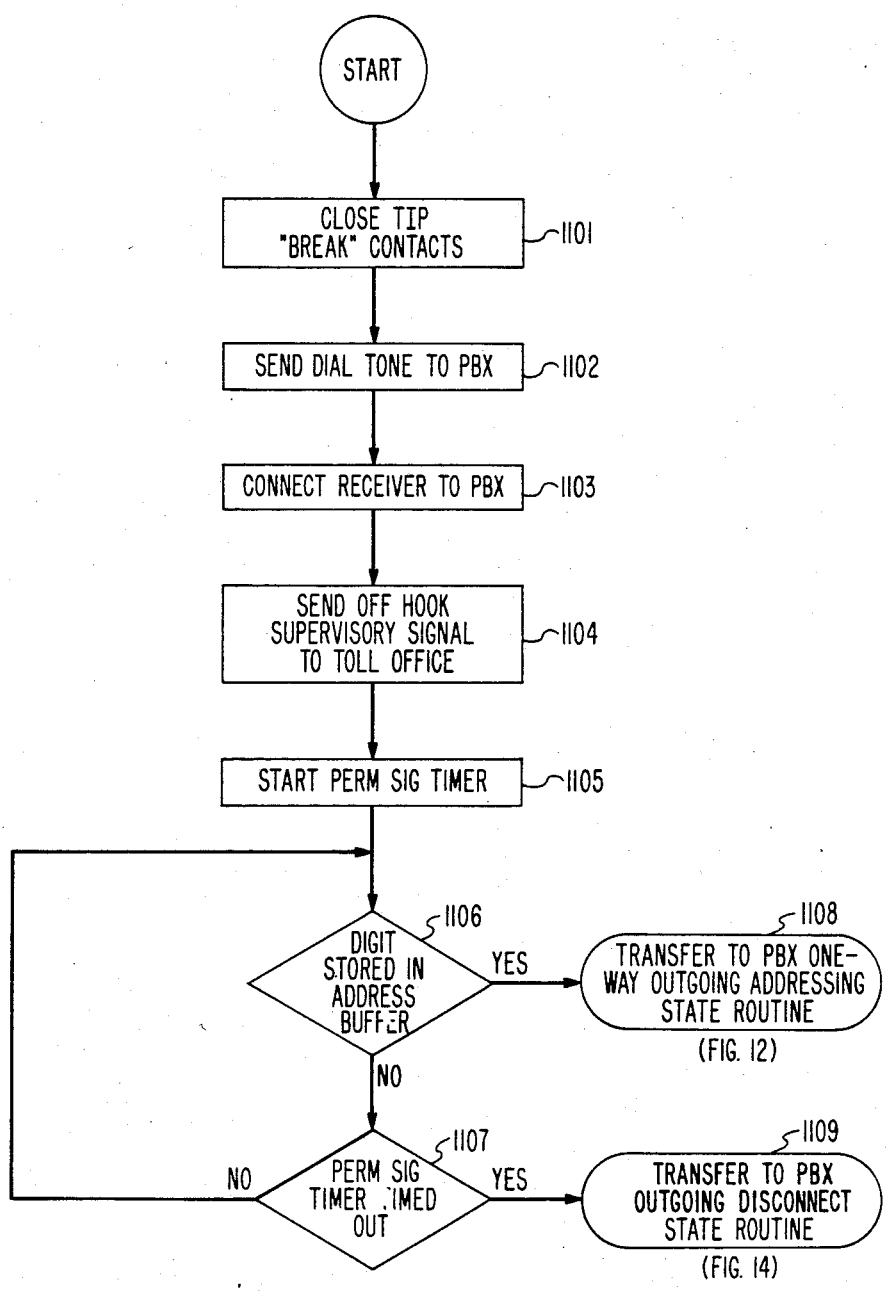

The PBX ONE-WAY OUTGOING IDLE STATE ROUTINE is depicted in FIG. 9. Under the control of this routine, the channel unit repeatedly determines the "on-hook/off-hook" condition of the PBX line (block 901). In the "idle" call state, tip "break" contacts 212 are open, and trunk interface unit applies −48 VDC battery to the ring lead. The PBX seizes the line by grounding the ring lead. Current flows in the ring lead, and the trunk interface unit sends an "off-hook" logic level control signal to the microcontroller. This is indicated in FIG. 8 at time T2 by PBX control signal 801 changing from an "on-hook" to an "off-hook" logic level representative of the "off-hook" condition of the PBX line. This "off-hook" condition usually indicates the origination of an outgoing call on the line from the PBX. To assure that this is the case, the microcontroller resets software hit timer 602 to perform well-known hit timing on "off-hook" control signal 801. When the PBX control signal remains at the "off-hook" logic level for a predetermined interval such as 30 milliseconds, a valid seizure is confirmed at time T3 (block 902). The call on the PBX line and the channel unit assumes the "seized" state, and control of the microcontroller is then transferred to the PBX ONE-WAY OUTGOING SEIZED STATE ROUTINE which is depicted in FIG. 11 (block 903).

Under the control of the PBX ONE-WAY OUTGOING SEIZED STATE ROUTINE, microcontroller 204 first causes relay 231 to close tip "break" contacts 212 (block 1101). The PBX removes the ground on the ring lead and interconnects the tip and ring leads to form a closed loop. With the trunk interface unit applying "normal battery" to the closed loop, current continues to flow, and PBX control signal 801 remains at the "off-hook" logic level. Next, analog switch 219 closes to send dial tone from generator 203 to the tip and ring leads via receive path 281 and trunk interface unit 205 (block 1102). DTMF/DP receiver 201 is then connected to the PBX line via transmit path 280 and analog switch 207 to receive DTMF address signals and also connected to the PBX line via loop closure lead 253 to receive DP address signals (block 1103). And lastly, microcontroller 204 sends an "off-hook" logic level signal to the toll office such as channel unit to toll office control signal 802 at time T4 (block 1104) and starts software permanent signal timer 603 for a permanent signal timing interval such as 12-15 seconds (block 1105). When "off-hook" logic level control signal 802 is sent to toll office at time T4, the on the toll office line assumes the "seized" state.

During the permanent signal timing interval, microcontroller 204 compares input and output address digit buffer pointers 604 and 605 to determine if an address digit has been stored in address digit buffer 606 (block 1106). When an address digit has not been stored, microcontroller 204 repeatedly examines permanent signal timer 603 (block 1107) and compares the input and output address digit buffer pointers until either the timing interval elapses or an address digit is stored in the buffer. When the permanent signal timing interval has elapsed, control is transferred to the PBX ONE-WAY OUTGOING DISCONNECT STATE ROUTINE which causes the toll office to abandon the call (block 1109).

When a valid DTMF digit is received from the PBX such as between times T5 and T6 of PBX a.c. control signal 804, DTMF/DP receiver 201 sends the microcontroller an interrupt signal on input control lead 256 and a hexadecimal representation of the received address digit on input bus 257. After the receipt of a valid address digit, the call on the PBX line and channel unit assumes the "addressing" state. A valid DTMF address signal such as PBX a.c. control 804 between times T5 and T6 typically comprises a burst of DTMF tone lasting, for example, 65 milliseconds followed by an interval of silence lasting, for example, 55 milliseconds.

Likewise, when the PBX line utilizes DP address signaling instead of DTMF address signaling, DTMF/DP receiver 201 may also receive a valid DP address signal such as PBX d.c. control signal 801 between times T5 and T6 from the PBX. However, the "on-hook" and "off-hook" logic level intervals, such as 60 and 40 milliseconds, may differ from the "tone-on" and "tone-off" intervals of the DTMF a.c. address signal.

Figure 10:
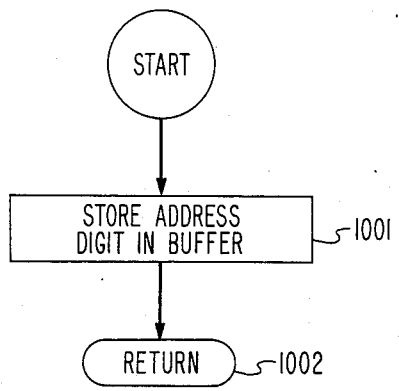

In response to the interrupt signal, the microcontroller suspends execution of the present program and calls the ADDRESS DIGIT INTERRUPT ROUTINE which is depicted in FIG. 10. Under the control of this routine, microcontroller 204 enters the received address digit into address digit buffer 606 of data memory 304 (block 1001). Upon completion of the interrupt routine, control is returned to the interrupted program (block 1002). This interrupt routine is called each time DTMF/DP receiver 201 receives another valid DTMF address digit such as PBX a.c. control signal 804 between times T9 and T10.

Returning to the PBX ONE-WAY OUTOING SEIZED STATE ROUTINE depicted in FIG. 11, it can be seen that when the first address digit is stored in address digit buffer 606, control is transferred to the PBX ONE-WAY OUTGOING ADDRESSING STATE ROUTINE (block 1108).

Figure 12:
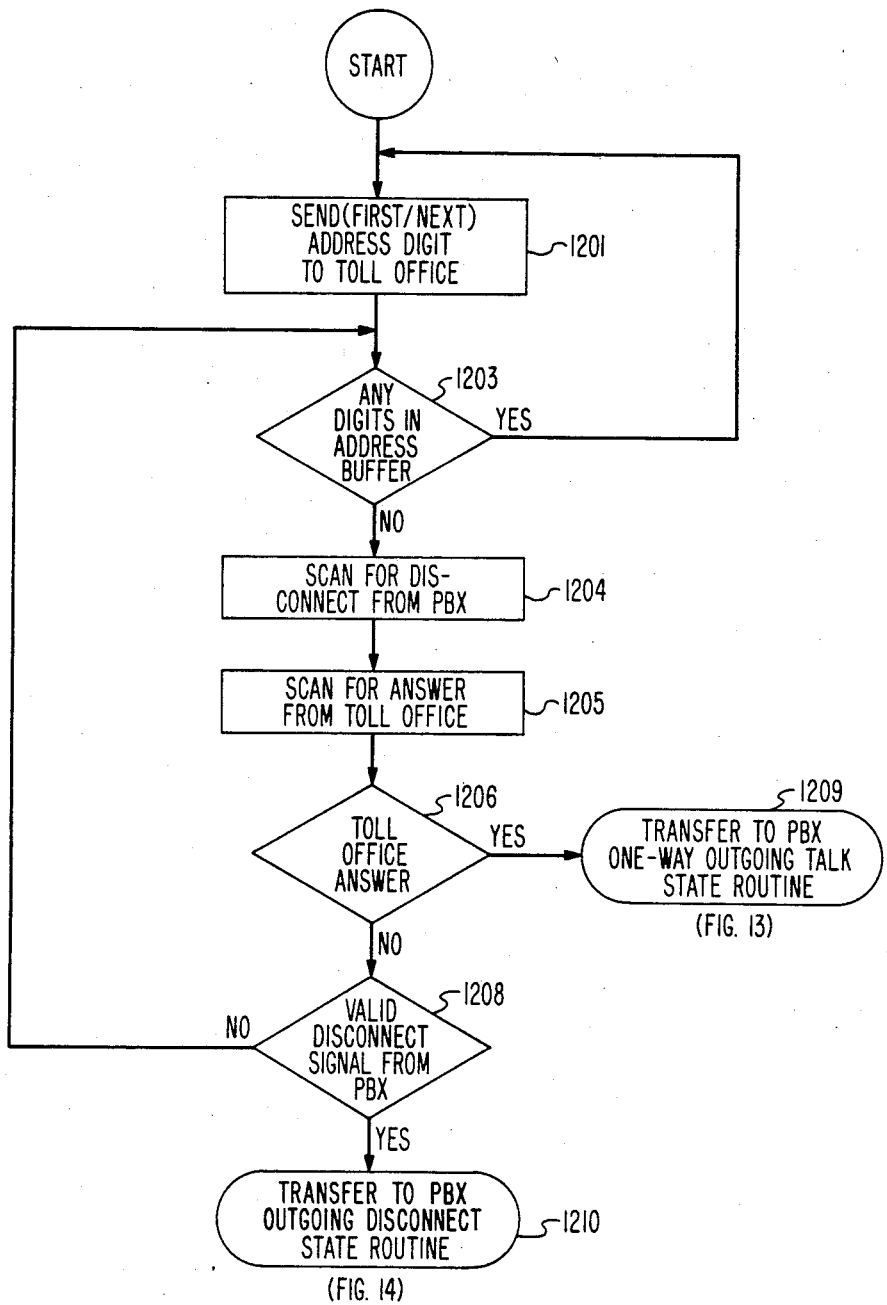

The PBX ONE-WAY OUTOING ADDRESSING STATE ROUTINE of FIG. 12 controls the transmission of stored address digits to the toll office until either the toll office returns an answer signal or the PBX sends a disconnect signal. Under the control of this routine, microcontroller 204 sends the first address digit stored in buffer 606 to the toll office using software toll DP timer 608 (block 1201). The transmission of the first address digit is illustrated by channel unit signal 802 between times T7 and T8. Using toll interdigit timer 609, the controller continues to send any other stored digits such as signal 802 between times T11 and T12 until the address digit buffer is empty (blocks 1201-1203). When the toll office line 118 receives the first address digit such as control signal 802 at time T8, the call on the toll office line assumes the "addressing" state. The microcontroller compares input and output address digit buffer pointers 604 and 605 to determine if any digits are in the buffer. When the buffer is empty, the microcontroller scans for a disconnect signal from the PBX (block 1204) and an answer signal from the toll office (block 1205) until the toll office returns an answer signal (block 1206) or the PBX sends a valid disconnect signal (block 1208).

Figure 13:
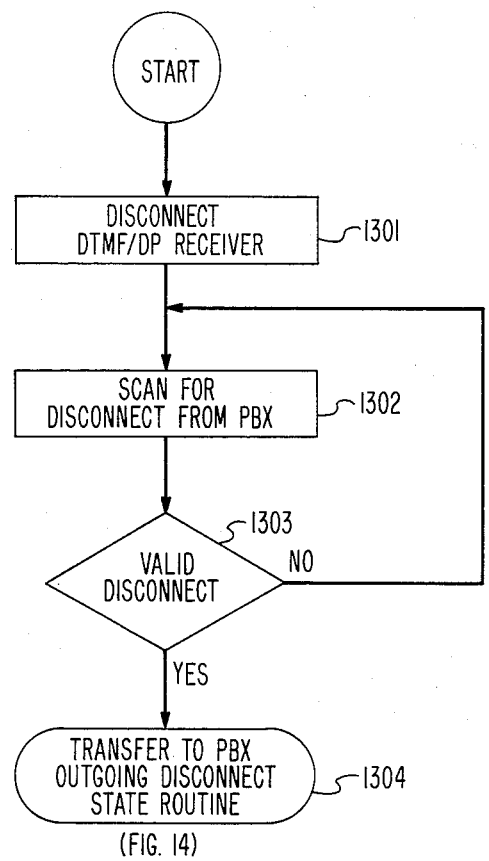

When the toll office returns an answer signal such as "off-hook" control signal 803 at time T13, control of the microcontroller is transferred to the PBX ONE-WAY OUTGOING TALK STATE ROUTINE which is depicted in FIG. 13 (block 1209).

When a valid disconnect signal is received from the PBX, control is transferred to the PBX ONE-WAY OUTOING DISCONNECT ROUTINE to abandon the call (block 1210).

Normally, the toll office returns an answer signal such as toll office control signal 803 at time T13, and the call on the PBX and toll office lines as well as the channel unit assumes the well-known "talk" state. Under control of the PBX ONE-WAY OUTOING TALK STATE ROUTINE of FIG. 13, microcontroller 204 disconnects DTMF/DP receiver 201 from the PBX line (block 1301) and scans for a disconnect signal from the PBX until a valid disconnect signal has been confirmed (blocks 1302-1303). For example, when PBX control signal 801 assumes "on-hook" logic level at time T14, microcontroller 204 resets software disconnect timer 611. After a predetermined interval such as 160 milliseconds at T15, "on-hook" logic level control signal 801 is considered a valid disconnect signal from the PBX When a valid disconnect signal is received (block 1303), the call on the PBX line and the channel unit assume the "disconnect" state, and control is transferred to the PBX OUTGOING DISCONNECT STATE ROUTINE (block 1304).

Figure 14:
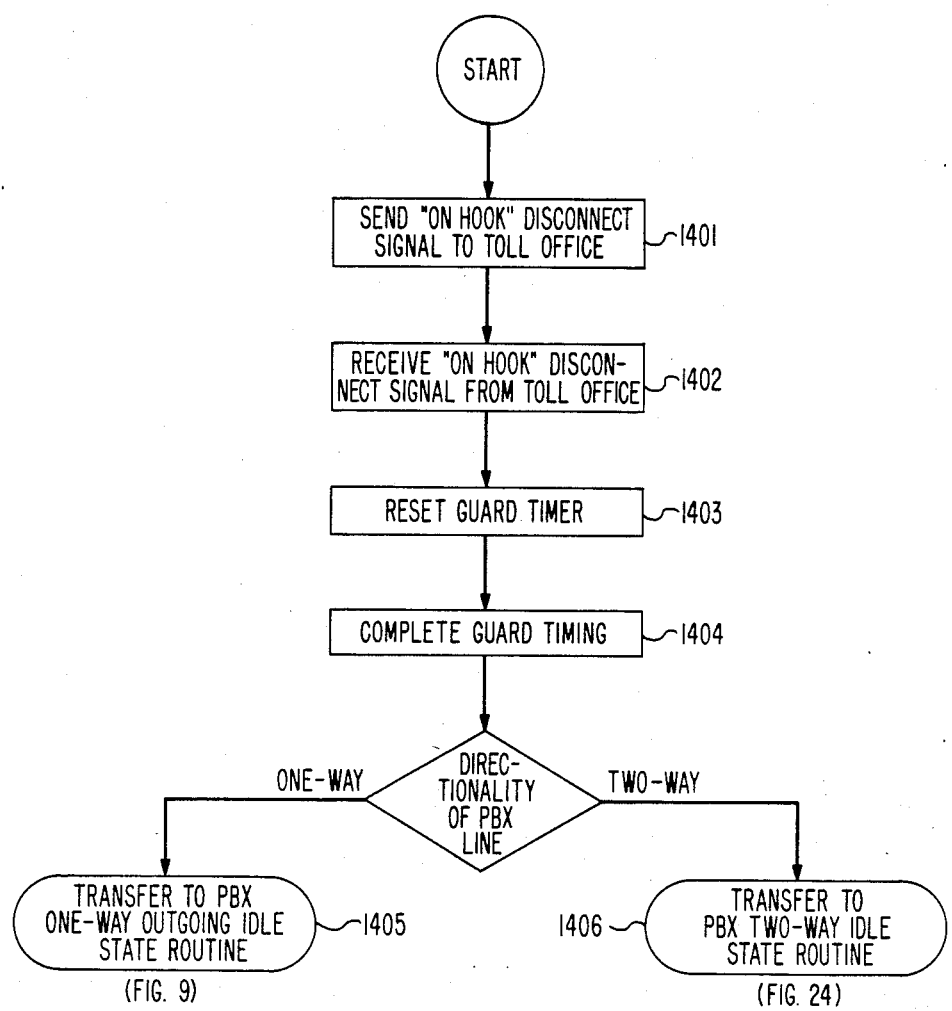

The PBX OUTGOING DISCONNECT STATE ROUTINE is depicted in FIG. 14. Under the control of this routine, the channel unit sends a disconnect signal to the toll office such as "on-hook" logic level channel unit control signal 802 at time T16 (block 1401). A short time later, toll office 101 returns a disconnect signal, such as "on-hook" logic level toll office control signal 803 at time T18, indicating that the call on the toll office line has assumed the "disconnect" state (block 1402). Microcontroller 204 resets software guard timer 607 for a predetermined guard timing interval in which the channel unit ignores any toll office and PBX control signal level changes (block 1403). During this interval, microcontroller 204 causes tip relay 231 to open tip "break" contacts 212 and also causes trunk interface unit to apply −48VDC battery to the ring lead by activating the ground start control signal. At the end of the guard timing interval at time T18 (block 1404), the call on the two lines and channel unit again assume the "idle" state, and control is transferred to the PBX ONE-WAY OUTGOING IDLE STATE ROUTINE (block 1405).

The second type of PBX line with respect to directionality is the one-way incoming line. As previously described, the unpowered channel unit is designated for a particular type of PBX line by selectively setting the PBX line identification switches on the channel unit. When power is applied to the channel unit, the PBX line type is entered in the data memory of the channel unit. When the directionality of the PBX line is one-way incoming, control is transferred to the PBX ONE-WAY INCOMING IDLE STATE ROUTINE.

Figure 15:
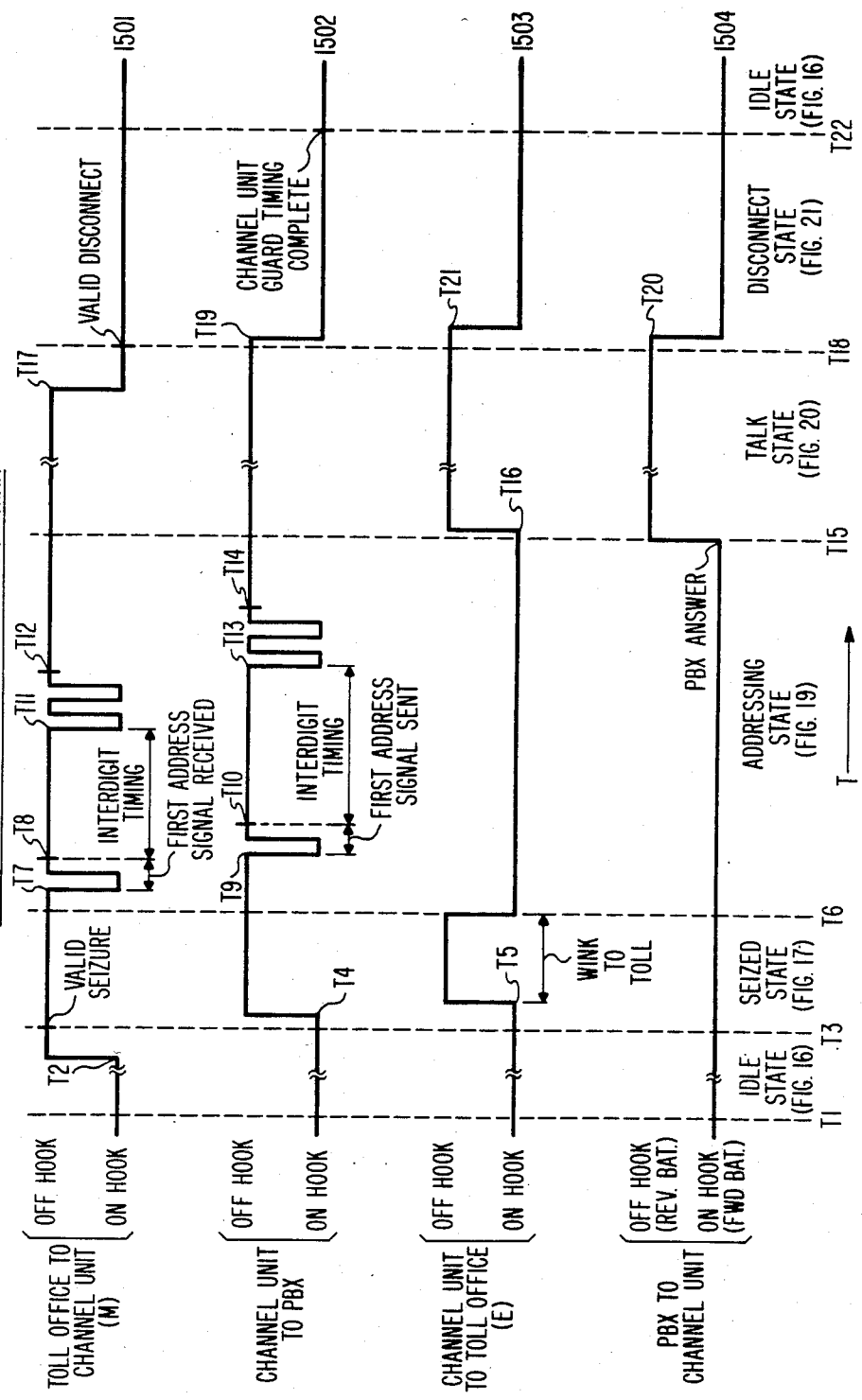
FIG. 15 is a timing diagram of the control signals used to advance the state of a call on a one-way incoming PBX line and a one-way outgoing toll office line.

The operation of the channel unit for interconnecting a two-wire, one-way incoming PBX line with loop start seizure supervisory signaling, loop reverse battery answer and disconnect supervisory signaling, DP address signaling, an immediate start signaling protocol, and a four-wire, one-way outgoing toll office line with E & M supervisory and address signaling and a wink start signaling protocol may be better understood with reference to the timing diagram of FIG. 15 and the flow diagrams of FIGS. 16 through 22.

Depicted in the timing diagram of FIG. 15 is a graphical representation of idealized toll office to channel unit control signal 1501, channel unit to PBX control signal 1502, channel unit to toll office control signal 1503, and PBX to channel unit control signal 1504 that are all plotted with respect to time. Toll office to channel unit control signal 1501 on lead 262 and channel unit to toll office control signal 1503 on lead 261 indicate the state of the call on receive control signal bus 254 from and transmit control signal bus 240 to the toll office, respectively. Changes in these signals for predetermined periods of time cause transitions from one call state to another as shown in the diagram. The "on-hook" and "off-hook" logic levels of control signals 1501 and 1503 represent the "on-hook" and "off-hook" conditions of receive PAM signal bus 254 from and transmit PAM signal bus 240 to the toll office. Channel unit to PBX control signal 1502 on lead 260 and PBX to channel unit control 1504 on loop closure lead 253 indicate the state of the call on PBX line 106. Changes in PBX control signals 1502 and 1504, for predetermined periods of time, cause transitions from one call state to another similar to toll office control signals 1501 and 1503. Again, the "on-hook" and "off-hook" logic levels of the PBX control signal 1502 and 1504 represent the "on-hook" and "off-hook" condition of the PBX line from and to the PBX. The call states between the time segments shown on the bottom of the diagram indicate the call state of the channel unit. The channel unit assumes the most advanced state of the call on either one of the toll office and PBX lines and then advances the state of the call on the other line to that state.

By way of example, control signals 1501–1504 at time T1 are all at an "on-hook" logic level representative of the "on-hook" condition of the PBX and toll office lines. Since the call on the PBX and toll office lines as well as the channel unit are in an "idle" state, channel unit 109 is under the control of the PBX ONE-WAY INCOMING IDLE STATE ROUTINE.

Figure 16:
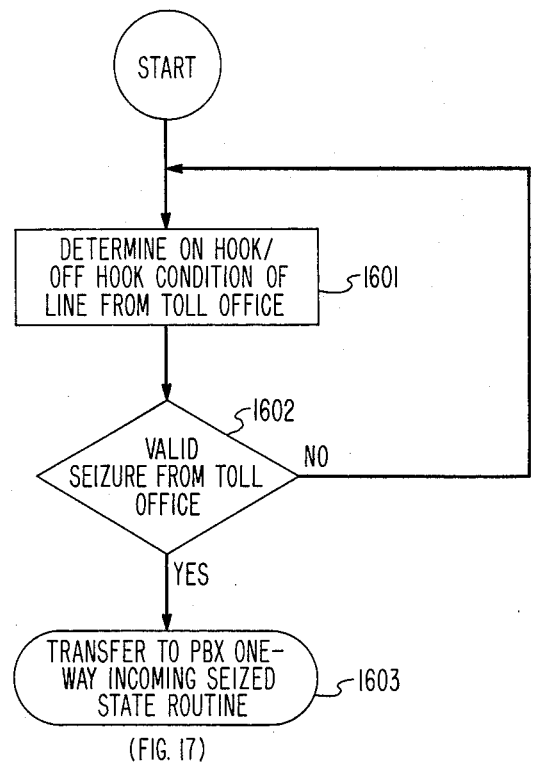
FIGS. 16 through 22 show the detailed flow diagrams of the routines used by the channel unit to advance the state of a call on a one-way incoming PBX line and a one-way out going toll office line.

The ONE-WAY INCOMING IDLE STATE ROUTINE is depicted in FIG. 16. Under the control of this routine, the channel unit repeatedly scans the toll office line for a change from an "on-hook" to an "off-hook" condition (block 1601). This is indicated in FIG. 15 at time T2 by toll office control signal 1501 changing from an "on-hook" to an "off-hook" logic level representative of the "off-hook" condition of the line. As previously described, hit timing is performed to assure that the "off-hook" condition indicates a valid seizure of the line. When hit timing is completed at time T3, a valid seizure is confirmed (block 1602), the channel unit and the call on the line from the toll office assume the "seized" state (block 1603).

Figure 17:
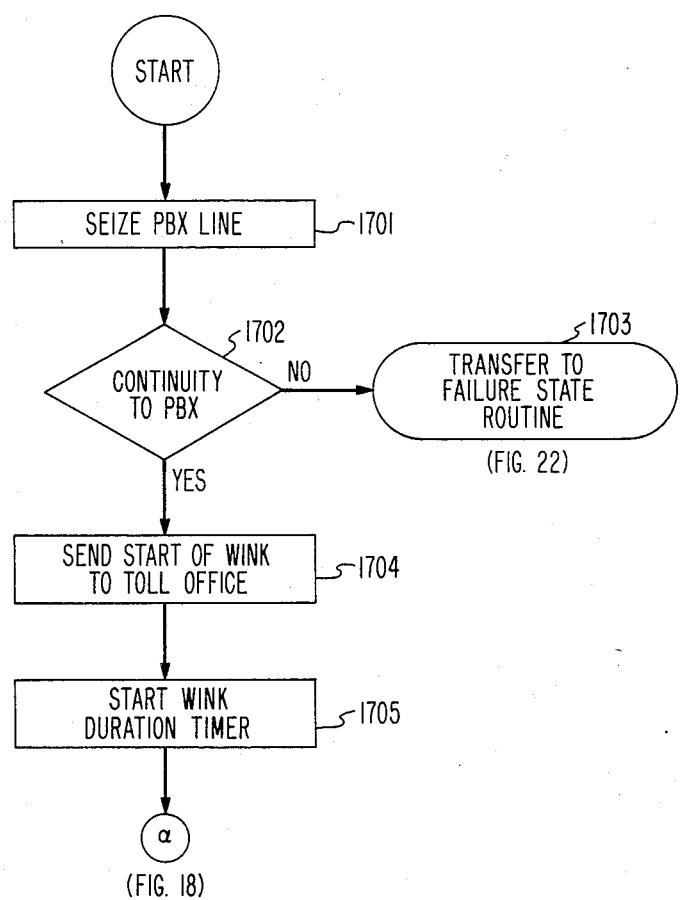
Figure 18:
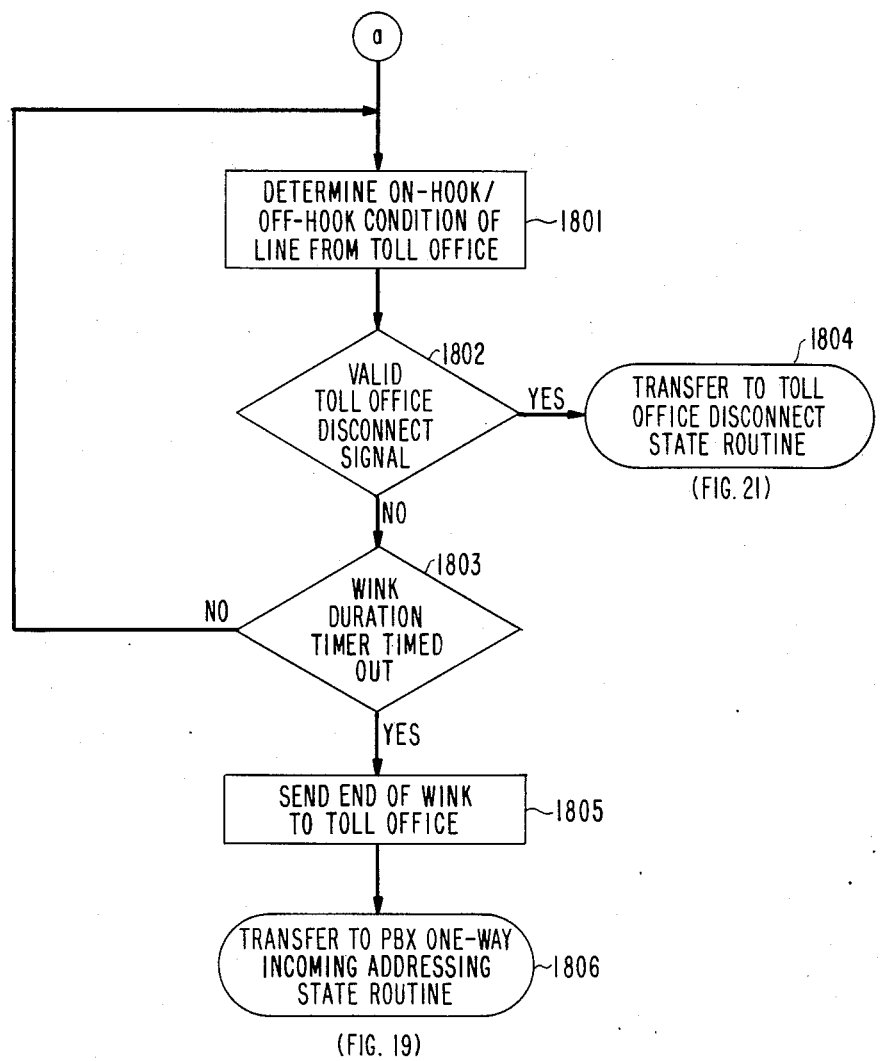

The PBX ONE-WAY INCOMING SEIZED STATE ROUTINE is depicted in FIG. 17. Under the control of this routine, the channel unit first seizes the PBX line (block 1901). When the one-way incoming PBX line is in an "on-hook" condition and the call thereon is in an "idle" state, the PBX applies normal battery to the open line, i.e., ground on the lead and −48VDC on the lead. Tip and ring "break" contacts 212 and 213 are open. By activating feed shutdown (FS) lead 264, microcontroller 204 causes trunk interface unit 205 to present a termination impedance such as 300 ohms across tip and ring terminals 233 and 234. The microcontroller seizes the PBX line by sending a control signal such as 1502 at time T4 on leads 260 and 282 that cause relays 231 and 232 to close tip and ring "break" contacts 212 and 213 (block 1701). Normally, the PBX line should now be a closed loop with current flowing therein. When current flows in the closed PBX loop, trunk interface unit 205 so indicates to the microcontroller by activating loop closure lead 253. The call on the PBX line is now in the "seized" state.

The microcontroller performs a continuity check of the PBX line by examining the level of the signal on loop closure lead 253 (block 1702). When an open circuit condition is detected ("on-hook" logic level), control is transferred to the FAILURE ROUTINE (block 1703). As a result, an expected wink supervisory signal is not sent to the toll office. Accordingly, this causes the toll office to abandon the call after some predetermined time interval.

Figure 22:
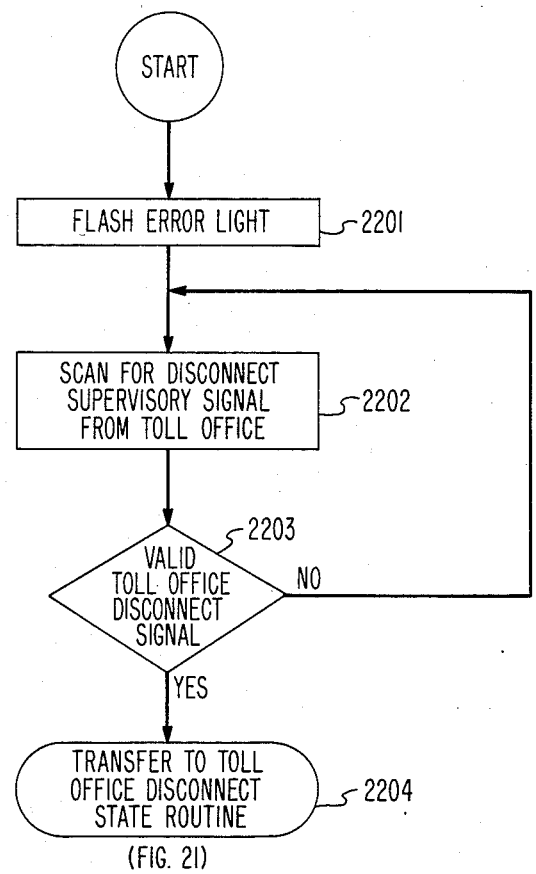

The FAILURE STATE ROUTINE is depicted in FIG. 22. Under the control of this routine, microcontroller activates lead 284 to cause fault indicator 235 to light (block 2201). Next, the channel unit repeatedly scans the line from the toll office for a valid disconnect signal such as control signal 1501 between times T17 and T18 (block 2202 and 2203). When a valid disconnect signal from the toll office is confirmed, control is transferred to the TOLL OFFICE DISCONNECT STATE ROUTINE.

When continuity to the PBX is established ("off-hook" logic level), the channel unit sends the start of the wink supervisory signal to the toll office such as channel unit control signal 1503 at time T5 (block 1704) and starts wink duration timer 610 (block 1705). The channel unit then repeatedly determines the "on-hook/off-hook" condition of the line from the toll office (block 1801) until either a valid disconnect signal from the toll office is confirmed (block 1802) or wink duration timer 610 times out (block 1803). When a valid disconnect signal from the control toll office is confirmed before the wink duration interval elapses, control is transferred to the TOLL OFFICE DISCONNECT STATE ROUTINE (block 2009). When the wink duration interval has elapsed, the channel unit sends the end of the wink supervisory signal to the toll office such as channel unit control signal 1503 at time T6 (block 1805). The channel unit and the call on the toll office line assume the "addressing" state, and control is transferred to the PBX ONE-WAY INCOMING ADDRESSING STATE ROUTINE (block 1806). Since the signaling protocols of the two lines are different, it should be kept in mind that the channel unit generated the wink supervisory signal and not the PBX line.

Figure 19:
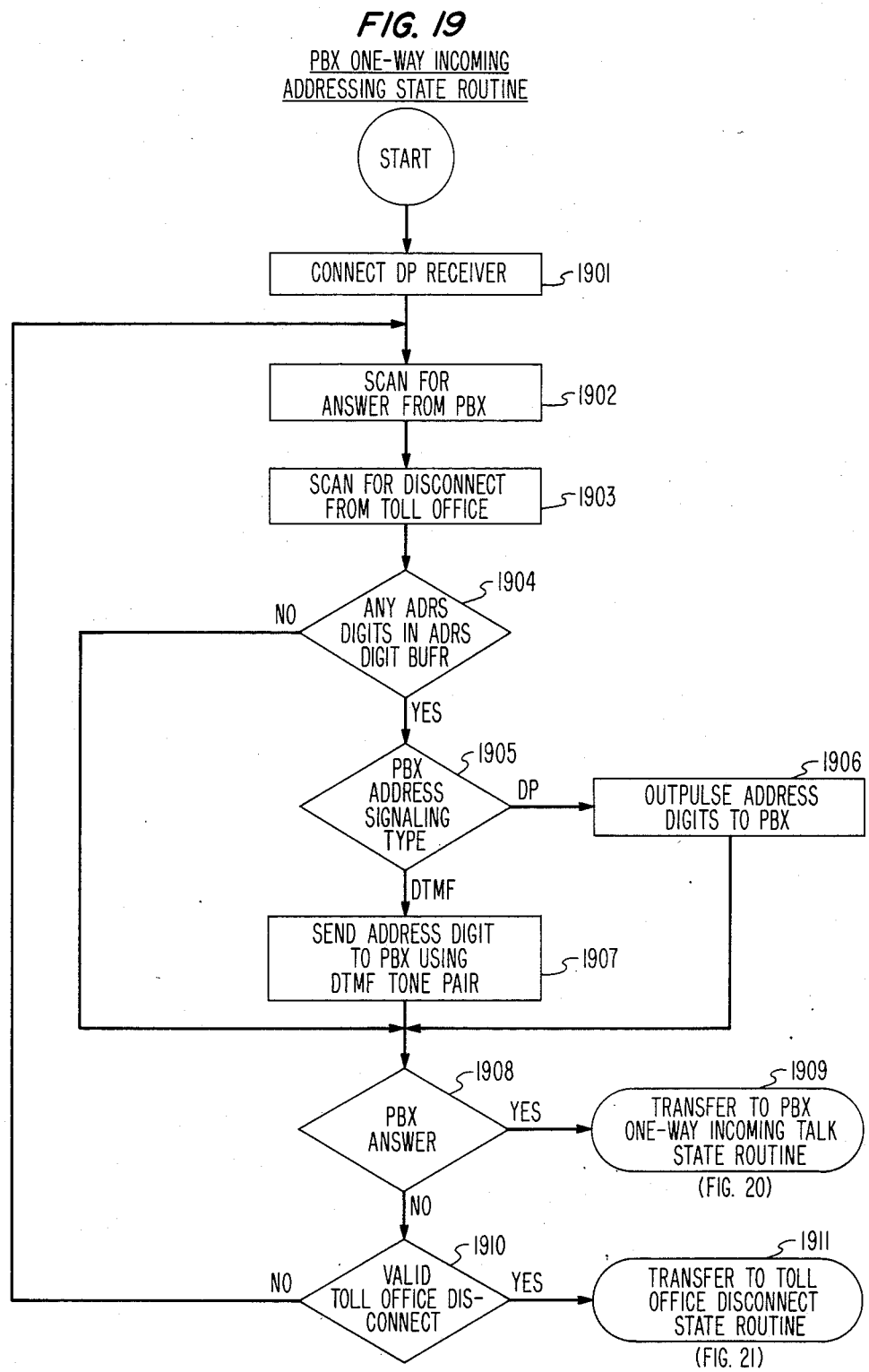

Under the control of the PBX ONE-WAY INCOMING ADDRESSING STATE ROUTINE of FIG. 19, the channel unit collects dial pulse address signals from the toll office and sends either dial pulse or dual-tone multifrequency address signals to the PBX until either an answer signal is returned from the PBX or the toll office sends a disconnect signal. First, the microcontroller connects DTMF/DP receiver 201 to the toll office line (block 1901). Next, the channel unit scans for an answer signal from the PBX (block 1902) or a disconnect signal from the toll office (block 1903) until an address digit is stored in the address digit buffer (block 1904). When an address digit is received from the toll office such as toll office control signal 1501 between times T7 and T8, the DTMF/DP receiver sends an interrupt signal to the microcontroller. The ADDRESS DIGIT INTERRUPT ROUTINE is then called to load the address digit buffer with the incoming digit. Depending on the address signaling type of the PBX line, the channel unit sends either dial pulse or DTMF address digits to the PBX (block 1905). When the PBX line requires DTMF address signals, the microcontroller sends a hexadecimal representation of the address digit to DTMF transmitter 201 which sends the address digit to the PBX as a dual-tone multifrequency signal (block 1907). When the PBX line requires dial pulse address signals, the microcontroller causes relays 231 and 232 to send the address digit such as control signal 1502 between time T9 and T10 to the PBX by opening and closing "break" contacts 212 and 213. Upon receipt of the first valid address digit at time T10, the call on the PBX line assumes the "addressing" state. This procedure is repeated each time an address digit is received from the toll office as depicted by control signals 1501 and 1502 between times T11 and T14. The channel unit will continue to send address digits until an answer signal is received from the PBX or a valid disconnect signal from the toll office is confirmed. When an answer signal such as control signal 1504 at time T15 is received from the PBX (block 1908), the channel unit and the call on the PBX line assume the "talk" state, and control is transferred to the PBX ONE-WAY INCOMING TALK STATE ROUTINE (block 1909). When a valid disconnect signal from the toll office is confirmed (block 1910), control is transferred to the TOLL OFFICE DISCONNECT ROUTINE (block 1911).

Figure 20:
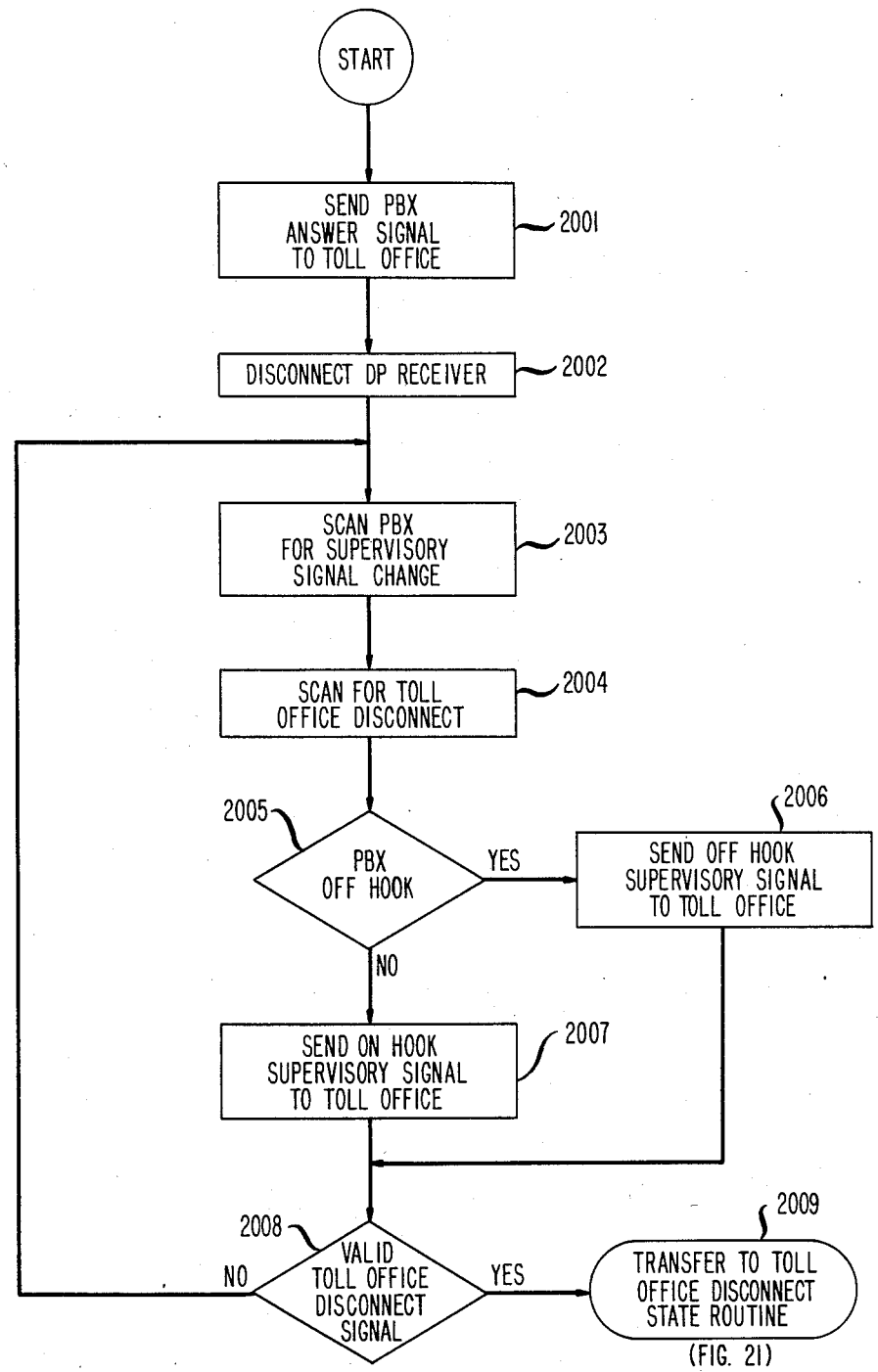

The PBX ONE-WAY INCOMING TALK STATE ROUTINE is depicted in FIG. 20. Under the control of this routine, the channel unit sends a PBX answer signal to the toll office (block 2001). The answer signal from the PBX is indicated by a battery reversal on the tip and ring leads of the PBX line. First, the microcontroller activates the reverse battery (RB) control signal on lead 263 which causes the polarity of the trunk interface unit loop closure detector to be reversed. When the PBX reverses the battery on the tip and ring leads, trunk interface unit 205 activates the loop closure signal such as control signal 1504 at time T15 on lead 253 to the microcontroller. In response, microcontroller 204 sends an "off-hook" logic level signal such as control signal 1503 at time T16 to the toll office, and the call on the toll office line assumes the "talk" state. Next, the microcontroller disconnects the dial pulse receiver from the toll office (block 2002). The channel unit then scans the PBX line for any supervisory signal changes (block 2003) and scans the toll office line for a disconnect signal (block 2004). As long as the channel unit detects the "off-hook" supervisory signal from the PBX line during the "talk" call state (block 2005), the microcontroller continues to send the "off-hook" supervisory signal to the toll office (block 2006). However, when an "on-hook" supervisory signal from the PBX is detected, the microcontroller converts and sends this "on-hook" supervisory signal to the toll office (block 2007). When a disconnect signal such as control signal 1501 at time T17 is received from the toll office, microcontroller 204 resets software disconnect timer 611. After a predetermined interval such as 160 milliseconds at time T18, the "on-hook" control signal is considered a valid disconnect signal from the toll office (block 2008), and the channel unit and the call on the toll office line assume the "disconnect" state. Control is transferred to the TOLL OFFICE DISCONNECT STATE ROUTINE (block 2009).

Figure 21:
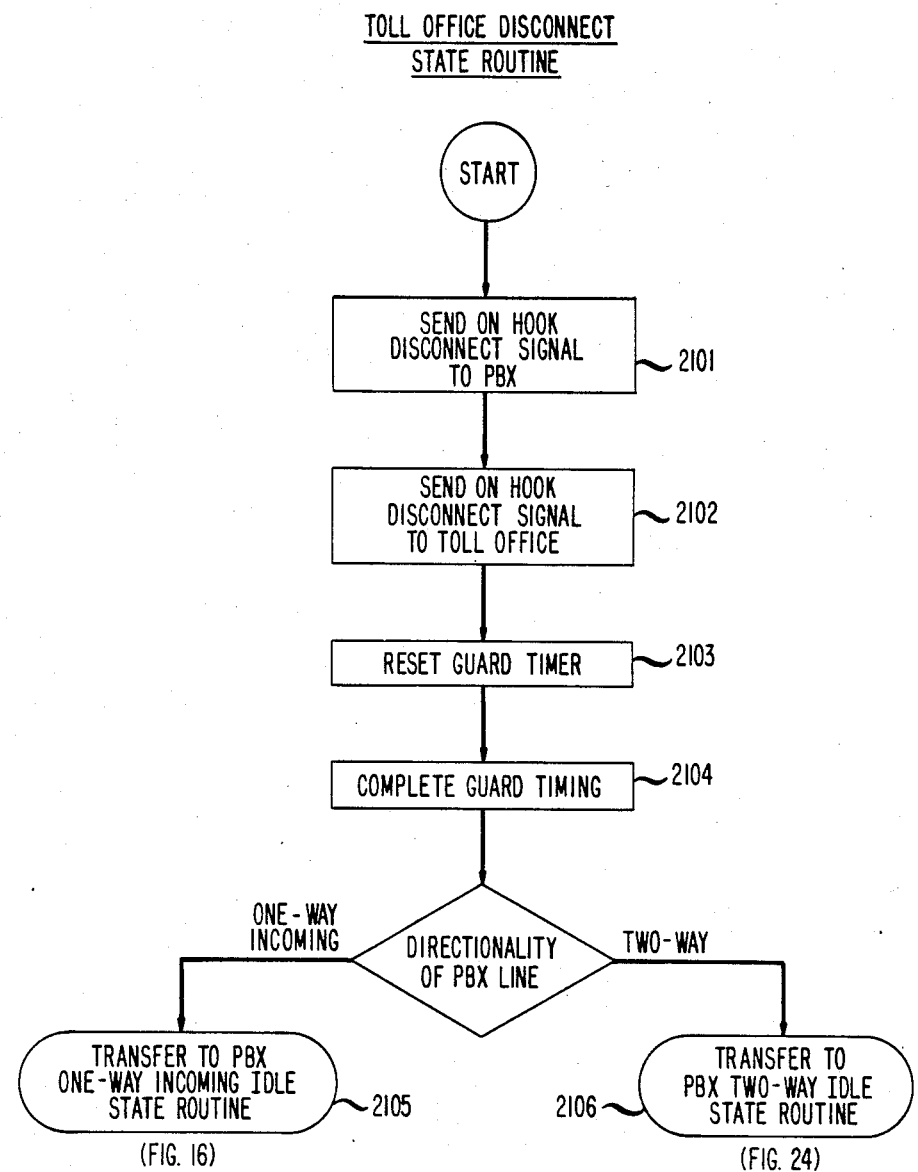

Under the control of the TOLL OFFICE DISCONNECT STATE ROUTINE of FIG. 21, the channel unit sends a disconnect signal to the PBX such as "on-hook" control signal 1502 at time T19 (block 2101). This is accomplished by opening tip and ring lead "break" contacts 212 and 213. When the contacts are opened, such as control signal 1504 at time T20, PBX control signal 1504 assumes the "forward battery" logic level, and the call on the PBX line assumes the "disconnect" state. The microcontroller sends a disconnect signal such as "on-hook" control signal 1503 at time T21 to the toll office (block 2102) and resets guard timer 607 for a predetermined guard timing interval in which the channel unit ignores any toll office and PBX control signal level changes (block 2103). At the end of the guard timing interval at time T22 (block 2104), the call on the two lines as well as the channel unit again assume the "idle" state, and control is transferred to the PBX ONE-WAY INCOMING IDLE STATE ROUTINE (block 2105).

The third type of PBX line with respect to directionality is the two-way line. Either the toll office or the PBX may originate calls on a two-way line. For direct outward dialed calls on a two-way PBX line, the channel unit may implement the same state routines utilized for a call on the one-way outgoing PBX line as depicted in FIGS. 8 through 14. For attendant-assisted incoming calls on a two-way PBX line with either immediate start or wink start operation, the call does not assume an "addressing" state. Instead, the channel unit utilizes an "alerting" call state routine to send audible ringing to the toll office and in the immediate start case, power ringing to the PBX.

When power is applied to a channel unit designated for a two-way PBX line, the PBX line type is entered into the data memory of the channel unit, and control of the channel unit is transferred to the PBX TWO-WAY IDLE STATE ROUTINE as shown in FIG. 7. As previously described, channel unit identification switches 229 are selectively positioned to designate the channel unit for two-way operation.

Figure 23:
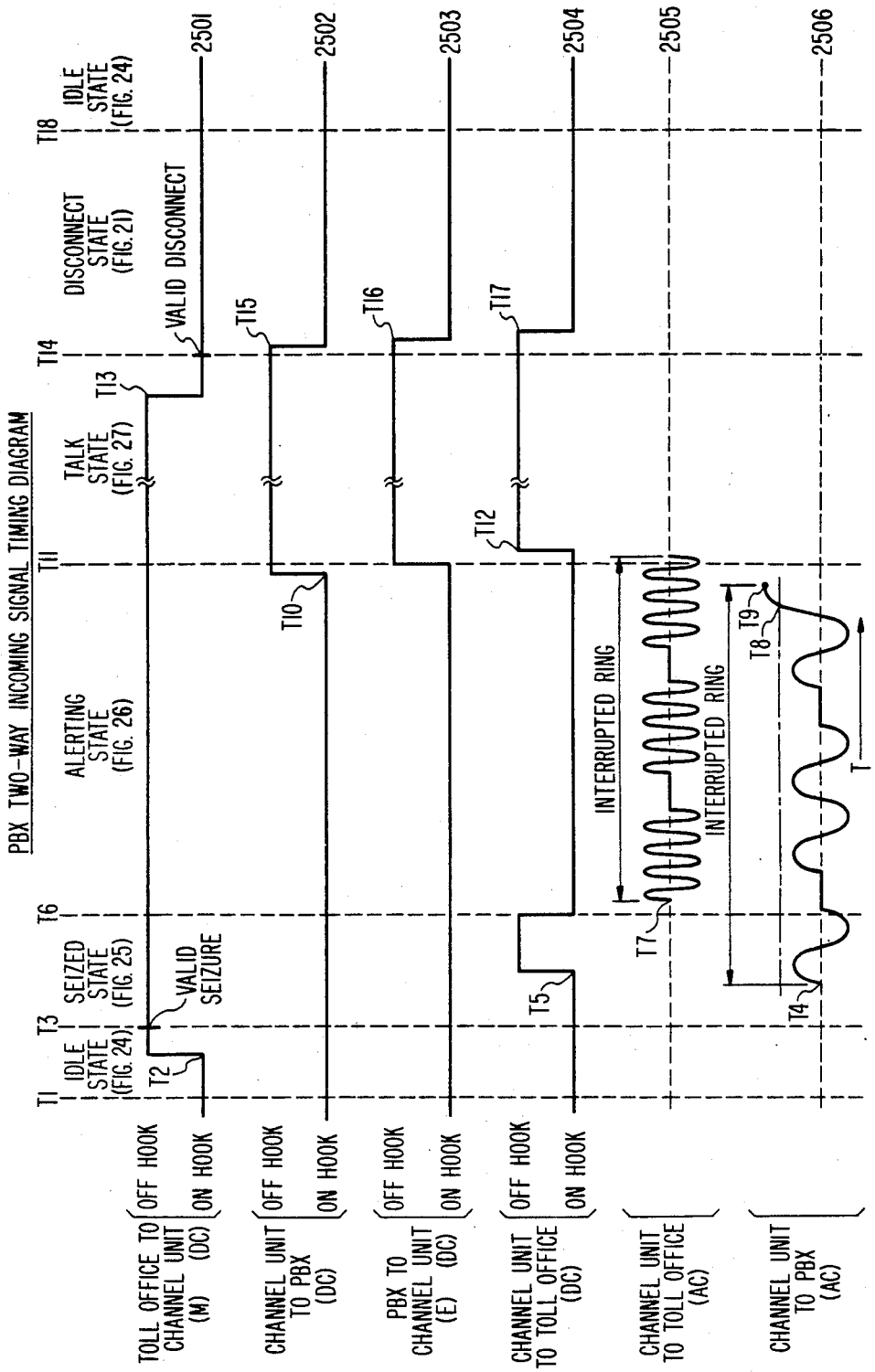
FIG. 23 is a timing diagram of the control signals used to advance the state of an incoming attendant call on two-way PBX line from a two-way toll office line.

The operation of the channel unit for interconnecting a two-wire, two-way PBX and four-wire, two-way toll office line may be better understood with reference to the timing diagram of FIG. 23 and the flow diagrams of FIG. 24 through 27. Furthermore, the two-way toll office line uses E and M supervisory and address signaling with immediate start operation when calls are originated from the toll office and wink start operation when calls are originated from the toll office. The two-way PBX line utilizes ground start seizure supervisory signaling and loop answer and disconnect supervisory signaling for calls in both directions, dial pulse address signaling for calls originated from the PBX, and immediate start operation for calls in both directions. It is to be kept in mind that the one-way PBX line description was with reference to loop start seizure supervisory signaling and loop reverse battery answer and disconnect supervisory signaling rather than ground start seizure supervisory signaling and loop answer and disconnect supervisory signaling. However, this difference is not important for the reader to understand the present invention. For direct outward dialed calls originated from the PBX, the reader is again referenced to the description on the one-way outgoing PBX line associated with FIGS. 8 through 14.

Depicted in the timing diagram of FIG. 23 is a graphical representation of idealized control signals 2501 through 2506, plotted with respect to time, for an incoming call to the PBX on an attendant-assisted two-way PBX line. Toll office to channel unit d.c. control signal 2501 on detector-sampler lead 262, channel unit to PBX d.c. control signal 2502 on relay control lead 260, PBX to channel unit d.c. control signal 2503 on loop closure lead 253, and channel unit to toll office d.c. control signal 2504 on detector-sampler lead 261 represent the "on-hook" and "off-hook" conditions of the lines to and from the PBX and toll office at various times. Channel unit to toll office a.c. control signal 2505 and channel unit to PBX a.c. control signal 2506 represent call progress control signals such as audible ringing and power ringing that are sent to the toll office and PBX at particular times. In addition, the d.c. component of channel unit to PBX control signal 2506 is used during the "alerting" slate of the call to advance the call to another call state.

By way of example, d.c. control signals 2501–2504 at time T1 are all at an "on-hook" logic level representative of the "on-hook" condition of the PBX and toll office lines. In addition, control signals 2505 and 2506 have a zero level d.c. component and no a.c. component. Tip "break" contact 212 is open, and ring "break" contact 213 is closed with "normal battery" such as −48VDC applied to the ring terminal and lead. Ground start (GS) control signal on lead 265 is activated causing trunk interface unit 205 to place a current detector between "normal battery" (−48VDC) and ring terminal 234. Since the call on the PBX and toll office lines as well as the channel unit are in an "idle" state, channel unit 109 is under the control of the PBX TWO-WAY IDLE STATE ROUTINE.

Figure 24:
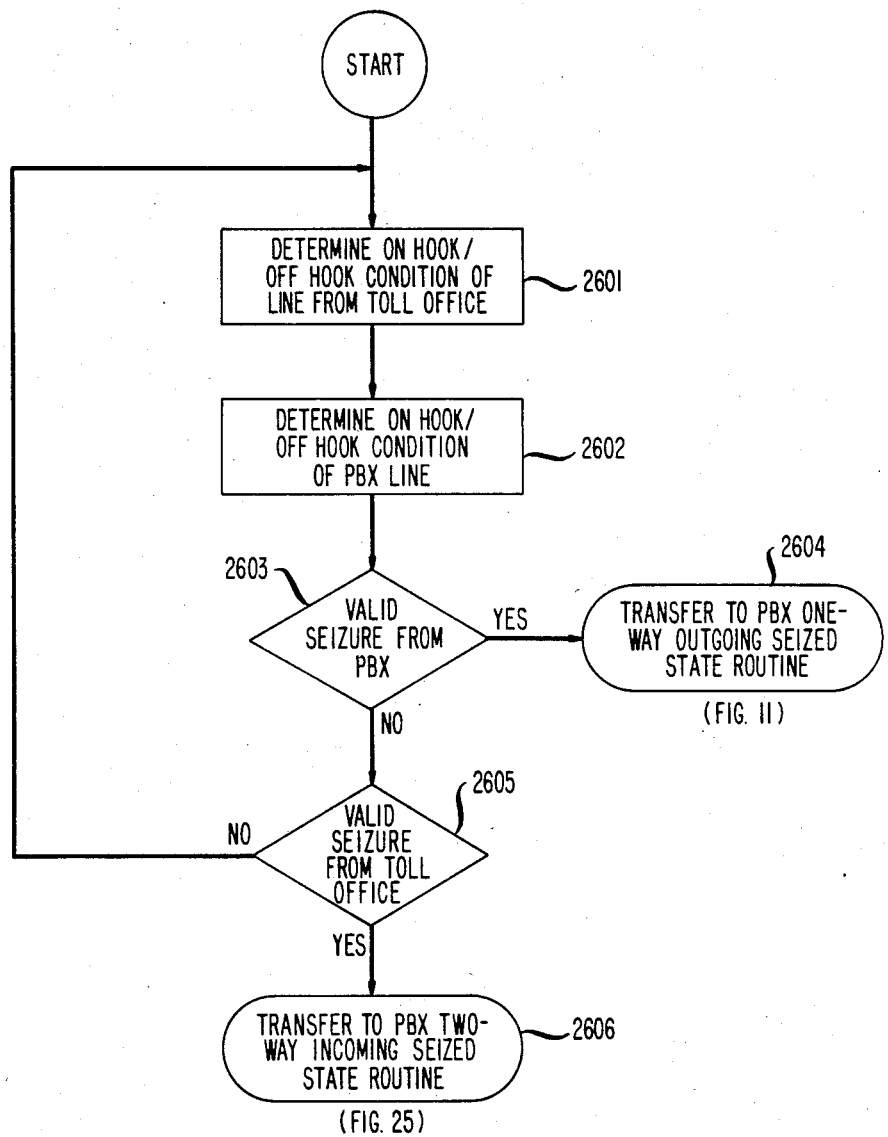
FIGS. 24 through 27 show the detailed flow diagrams of the routines used by the channel unit to advance the state of the operator assisted call depicted in FIG. 25.

Under the control of the PBX TWO-WAY IDLE STATE ROUTINE of FIG. 24, microcontroller 204 repeatedly scans the PBX and the toll office lines for an "off-hook" condition (blocks 2601 and 2602). When an "off-hook" condition of the PBX line has been confirmed as a valid seizure from the PBX (block 2603), control of the channel unit is transferred to the PBX ONE-WAY OUTGOING SEIZED STATE ROUTINE (block 2604). The call is then completed in the same manner as with the one-way outgoing PBX line using dial pulse or dual-tone multifrequency address signaling, which was previously described.

The "off-hook" condition of the line from the toll office is indicated in FIG. 23 at time T2 by toll office control signal 2501 changing from an "on-hook" to an "off-hook" logic level. Hit timing is then performed to assure that the "off-hook" condition indicates a valid seizure of the line or, moreover, that a call has been originated on the line from the toll office. When hit timing is completed at time T3, a valid seizure is confirmed (block 2605), and the channel unit and the call on the toll office assume the "seized" state. Control is then transferred to the PBX TWO-WAY INCOMING SEIZED STATE ROUTINE depicted in FIG. 25 (block 2606). Under the control of this routine, microcontroller 204 examines the PBX line for a valid seizure which would indicate a well-known glare condition (block 2701). When a glare condition exists, control is transferred to the PBX OUTGOING ROUTINE (block 2702), and the call is treated as an outgoing call from the PBX. In the absence of a valid PBX seizure, the microcontroller seizes the PBX line by connecting ring-trip detector 226 to the tip and ring leads of the PBX line through the "make" contacts of tip and ring "transfer" contacts 227 and 228 (block 2703). Microcontroller 204 causes relay 230 to close the "make" transfer contacts by activating lead 270. The ring-trip detector applies to the tip and ring leads a common 20-hertz power ringing signal, such as a.c. control signal 2506 at time T4, that seizes the PBX line. Next, microcontroller 204 generates a wink supervisory signal such as control signal 2504 between times T5 and T6 for transmission to the toll office (block 2704). This wink supervisory signal is generated and sent to the toll switch office even though a wink supervisory signal is not received from the PBX. After the wink supervisory signal has been sent to the toll office such as at time T6, the channel unit and the call on the toll office and PBX lines assume the "alerting" state, and control is transferred to the PBX TWO-WAY INCOMING ALERTING STATE ROUTINE of FIG. 26 (block 2705).

Under the control of the PBX TWO-WAY INCOMING ALERTING STATE ROUTINE, microcontroller causes an interrupted audible ringing signal such as a.c. control signal 2505 at time T7, to be sent to the toll office by connecting audible ringing generator 203 to detector-sampler 209 through analog switch 220 and summing circuit 221 (block 2801). The call on the PBX and toll office lines remain in the "alerting" state until either the PBX returns an answer signal (block 2802) or the toll office sends a disconnect signal to abandon the call (block 2803). When a valid disconnect signal from the toll office is confirmed (block 2804), control is transferred to the TOLL OFFICE DISCONNECT STATE ROUTINE which is depicted in FIG. 21 (block 2805).

Microcontroller 204 scans for an answer signal from the PBX by examining the level of the signal on lead 273 from the ring-trip detector (block 2803). The PBX sends an answer signal to the channel unit by terminating the tip and ring leads with a low impedance. The magnitude of the power ringing signal will reach a threshold level such as a.c.control signal 2506 at time T8. When this occurs, ring-trip detector 226 activates lead 273 to the microcontroller which causes relay 230 to disconnect the ring-trip detector from the tip and ring leads. Relay 230 accomplishes this by opening and closing respective "make" and "break" tip and ring transfer contacts 227 and 228. As a result, a.c. control signal 2506 at time T9 is disconnected along with the ring-trip detector from the tip and ring leads. The microcontroller activates the control signal on lead 260, such as control signal 2502 at time T10 which in turn causes tip "break" contact 212 to close. The PBX also interconnects the tip and ring leads, if not already connected, and d.c. current flows in the closed loop. Trunk interface unit 205 activates loop closure lead 253, and d.c. control signal 2503 assumes an "off-hook" level at time T11. Receiving an answer signal such as control signal 2503 at time T11 from the PBX, the channel unit and the call on the PBX line assume the "talk" state. Audible ringing to the toll office is discontinued (block 2807), and control is transferred to the PBX TWO-WAY TALK STATE ROUTINE depicted in FIG. 27 (block 2808).

Under the control of the PBX TWO-WAY TALK STATE ROUTINE, the channel unit sends an answer signal, such as "off-hook" control signal 2504 at time T12 to the toll office (block 2901), and the call on the toll office line assumes the "talk" state. While the call remains in a "talk" state, the microcontroller repeatedly scans both the PBX and toll office lines for a disconnect signal (blocks 2902 and 2903). Since only the toll office can abandon the call, the microcontroller scans the toll office trunk until a disconnect signal such as "on-hook" control signal 2501 at time T13 is received from the toll office. Microcontroller 204 simply converts and sends any PBX supervisory signals to the toll office (block 2903). When a valid toll office disconnect signal such as control signal 2501 at time T14 is confirmed (block 2904), the channel unit and the call on the line from the toll office assumes the "disconnect" state, and control is transferred to the TOLL DISCONNECT STATE ROUTINE (block 2905) of FIG. 21.

Under the control of the TOLL DISCONNECT STATE ROUTINE, microcontroller 204 sends a disconnect signal such as control signal 2502 at time T15 to the PBX by causing tip "break" contact 212 to open (block 2101). When the closed PBX loop is opened, the call on the PBX line assumes the "disconnect" state, and trunk interface unit 205 sends a disconnect signal such as control signal 2503 at time T16 to the microcontroller. In response, microcontroller 204 sends a disconnect signal such as control signal 2504 at time T17 on the line to the toll office (block 2102), and the call thereon assumes the "disconnect" state. Guard timing is then started (block 2103), and when completed at time T18 (block 2104), the channel unit and the call on the PBX and toll office lines, once again, assumes the "idle" state.

It is to be understood that the above-described channel unit is merely an illustrative embodiment of the principles of this invention and that numerous other arrangements may be devised by those skilled in the art without departing from the spirit and scope of the invention. In particular, one skilled in the art may easily develop a number of other routines to handle the conversion of address supervisory and electrical signaling between any two lines types.

What is claimed is:

1. For use with a first communications line utilizing a first signaling protocol and a second communications line utilizing a second signaling protocol different from said first signaling protocol, a channel unit for interfacing said signaling protocols, comprising:

first line receive converter means for converting first and second electrical interface signals representative of first and second conditions of said first line to first and second logic level signals also repersentative of said first and second conditions of said first line respectively;

control means responsive to a first predetermined series of said first and second logic level signals indicative of a first state in said first signaling protocol of a call when on said first line for generating a second predetermined series of said first and second logic level signals indicative of a first state in said second signaling protocol of said call when on said second line, said first state of said call when on said second line corresponding to said first state of said call when on said first line; and second line transmit converter means for converting said first and second logic level signals of said second predetermined series to third and fourth electrical interface signals representative of first and second conditions of said second line, respectively, for said call when on said second line to assume said first state corresponding to said first state of said call when on said first line.

2. The channel unit in accordance with claim 1 wherein said channel unit further comprises receiver means responsive to a third predetermined series of said first and second logic level signals representative of an address digit communicated on said first line for generating an encoded address digit signal also representative of said address digit and transmitter means responsive to said encoded address digit signal for transmitting to said second line an analog signal representative of said address digit.

3. The channel unit in accordance with claim 1 wherein said channel unit further comprises receiver means responsive to a third predetermined series of said first and second logic level signals representative of an address digit communicated on said first line for generating an encoded address digit signal also representative of said address digit and wherein said control means comprises means responsive to said encoded address digit signal for generating a fourth predetermined series of said first and second logic level signals also representative of said address digit for said second line.

4. The channel unit in accordance with claim 1 wherein said channel unit further comprises second line receive converter means for converting said third and fourth electrical interface signals to said first and second logic level signals, respectively; wherein said control means comprises means responsive to a third predetermined series of said first and second logic level signals indicative of a second state in said second signaling protocol of said call when on said second line for generating a fourth predetermined series of said first and second logic level signals indicative of a second state in said first signaling protocol of said call when on said first line, said second state of said call when on said first line corresponding to said second state of said call when on said second line; and wherein said channel unit still further comprises first line transmit converter means for converting said first and second logic level signals of said fourth predetermined series to said first and second electrical interface signals for said call when on said first line to assume said second state corresponding to said second state of said call when on said second line.

5. The channel unit in accordance with claim 4 wherein said channel unit further comprises generator means for generating a dial tone isgnal for said second line.

6. The channel unit in accordacne with claim 4 wherein said channel unit further comprises generator means for generating a ringing signal for said first line.

7. The channel unit in accordance with claim 4 wherein said channel unit further comprises circuit means for applying a ringing signal to said second line.

8. For use with a first communications line utilizing a first signaling protocol and a second communications line utilizing a second signaling protocol different from said first signaling protocol, a channel unit for interfacing said signaling protocols, comprising:
  second line receive converter means for converting first and second electrical interface signals representative of first and second conditions of said second line to first and second logic level signals also representative of said first and second conditions of said second line, respectively;
  control means responsive to a first predetermined series of said first and second logic level signals indicative of a state in said second signaling protocol of a call when on said second line for generating a second predetermined series of said first and second logic level signals indicative of a state in said first signaling protocol of said call when on said first line corresponding to said state of said call when on said second line; and
  first line transmit converter means for converting said first and second logic level signals of said second predetermined series to third and fourth electrical interface signals representative of first and second conditions of said first line, respectively, for said call when on said first line to assume said state corresponding to said state of said call when on said second line.

9. The channel unit in accordance with claim 8 wherein said channel unit further comprises receiver means responsive to an analog address signal communicated on said second line and representative of an address digit for generating an encoded address digit signal representative of said address digit and wherein said control means comprises means responsive to said encoded address digit signal for generating a third predetermined series of said first and second logic level signals representative of said address digit for said first line.

10. The channel unit in accordance with claim 8 wherein said channel unit further comprises receiver means responsive to a third series of said first and second logic level signals representative of an address digit communicated on said second line for generating an encoded address digit signal representative of said address digit and wherein said control means comprises means responsive to said encoded address digit signal for generating a fourth predetermined series of said first and second logic level signals representative of said address digit for said first line.

11. For use with a first communications line utilizing a first signaling protocol and second and third communications lines utilizing respective second and third signaling protocols each different from said first signaling protocol, a channel unit for interfacing the different signaling protocols of said first line and one of said second and third lines comprising:
  first converter means for converting first and second electrical interface signals representative of first and second conditions of said first line to first and second logic level signals also representative of said first and second conditions of said first line, respectively;
  means for indicating the identity of one of said second and third lines;
  control means responsive to a first predetermined series of said first and second logic level signals indicative of a first state in said first signaling protocol of a call when on said first line and also responsive to the identity of one of said second and third lines for generating a second predetermined series of said first and second logic level signals indicative of a first state in said second signaling protocol of said call when on said second line when the identity of said second line is indicated, said first state of said call when on said second line corresponding to said first state of said call when on said first line; and
  second converter means for converting said first and second logic level signals of said second predetermined series to third and fourth electrical interface signals representative of first and second conditions of said second line, respectively, for said call when on said second line to assume said first state corresponding to said first state of said call when on said first line.

12. The channel unit in accordance with claim 11 wherein said control means comprises means responsive to said first predetermined series of said first and second logic level signals and also responsive to the identity of one of said second and third lines for generating a third predetermined series of said first and second logic level signals indicative of a first state in said third signaling protocol of said call when on said third line when the identity of said third line is indicated, said first state of said call when on said third line corresponding to said first state of said call when on said first line and wherein said second converter means comprises means for converting said first and second logic level signals of said third predetermined series to fifth and sixth electrical interface signals representative of first and second conditions of said third line, respectively, for said call when on said third line to assume said first state corresponding to said first state of said call when on said first line.

13. The channel unit in accordacne with claim 12 wherein said second converter means further comprises means for converting said third and fourth electrical interface signals to said first and second logic level signals, respectively; wherein said control means further comprises means responsive to a fourth predetermined series of said first and second logic level signals indicative of a second state in said second signaling protocol of said call when on said second line for generating a fifth predetermined series of said first and second logic level signals indicative of a second state in said first signaling protocol of said call when on said first line when the identity of said second line is indicated, said second state of said call when on said first line corresponding to said second state of said call when on said second line; and wherein said first converter means comprises means for converting said first and second logic level signal of said fifth predetermined series to said first and second electrical interface signals for said call when on said first line to assume said second state corresponding to said second state of said call when on said second line.

14. The channel unit in accordance with claim 13 wherein said second converter means still further comprises means for converting said fifth and sixth electrical interface signals to said first and second logic level signals, respectively; and wherein said control means still further comprises means responsive to a sixth predetermined series of said first and second logic level signals indicative of a second state in said third signaling protocol of said call when on said third line for generating said fifth predetermined series of said first and second logic level signals when the identity of said third line is indicated, said second state of said call when on said first line corresponding to said second state of said call when on said third line.

15. For use with a first communications line utilizing first and second electrical interface signals, a second communications line utilizing third and fourth electrical interface signals different from said first and second interface signals, and a third communications line utilizing fifth and sixth electrical interface signals different from said first and second interface signals, a channel unit for interfacing said different electrical interface signals of said first line and one of said second and third lines comprising:
first converter means for converting said first and second electrical interface signals indicative of on-hook and off-hook conditions of said first line to first and second logic level signals also indicative of the on-hook and off-hook conditions of said first line, respectively;
means for indicating the identity of one of said second and third lines;
control means responsive to said first and second logic level signals indicative of the on-hook and off-hook conditions of said first line and also responsive to the identity of one of said second and third lines for generating first and second logic level signals indicative of on-hook and off-hook conditions of said second line, respectively, when the identity of said second line is indicated; and
second converter means for converting said first and second logic level signals indicative of the on-hook and off-hook conditions of said second line to said third and fourth electrical interface signals indicative of the on-hook and off-hook conditions of said second line, respectively.

16. The channel unit in accordance with claim 15 wherein said control means comprises means responsive to said first and second logic level signals indicative of the on-hook and off-hook conditions of said first line and also responsive to the identity of one of said second and third lines for generating first and second logic level signals indicative of on-hook and off-hook conditions of said third line, respectively, when the identity of said third line is indicated and wherein said second converter means comprise a means for converting said first and second logic level signals indicative of the on-hook and off-hook conditions of said third line to fifth and sixth electrical interface signals indicative of the on-hook and off-hook conditions of said third line, respectively.

17. The channel unit in accordance with claim 15 wherein said second converter means comprises means for converting said third and fourth electrical interface signals to said first and second logic level signals indicative of the on-hook and off-hook conditions of said second line, wherein said control means comprises means responsive to said first and second logic level signals indicative of the on-hook and off-hook conditions of said second line and also responsive to the identity of one of said second and third lines for generating said first and second logic level signals indicative of the on-hook and off-hook conditions of said first line when the identity of said second line is indicated; and wherein said first converter means comprises means for converting said first and second logic level signals indicative of the on-hook and off-hook conditions of said first line to said first and second electrical interface signals indicative of the on-hook and off-hook conditions of said first line, respectively.

18. The channel unit in accordance with claim 17 wherein said control means further comprises means responsive to said first and second logic level signals indicative of the on-hook and off-hook conditions of said first line and also responsive to the identity of one of said second and third lines for generating said first and second logic level signals indicative of the on-hook and off-hook conditions of said third line, respectively, when the identity of said third line is indicated and wherein said second converter means further comprises means for converting said first and second logic level signals indicative of the on-hook and off-hook conditions of said third line to said fifth and sixth electrical interface signals indicative of the on-hook and off-hook conditions of said third line, respectively.

19. The channel unit in accordance with claim 18 wherein said second converter means still further comprises means for converting said fifth and sixth electrical interface signals to said first and second logic level signals indicative of the on-hook and off-hook conditions of said third line, respectively, and wherein said control means still further comprises means responsive to said first and second logic level signals indicative of the on-hook and off-hook conditions of said third line and also responsive to the identity of one of said second and third lines for generating said signals indicative of the on-hook and off-hook conditions of said first line when the identity of said third line is indicated.

20. For use with a first communications line for communicating a combination of first and second electrical interface signals representative of an address digit and a second communications line for communicating an analog address digit signal representative of said address digit, a channel unit for interfacing the different representations of said address digit on said first and second lines comprising:

receiver means responsive to said analog address digit signal for converting said analog address digit signal to an encoded address digit signal representative of said address digit;

control means responsive to said encoded address digit signal for generating a predetermined series of first and second logic level signals representative of said address digit; and converter means for converting said predetermined series of said first and second logic level signals to said combination of first and second electrical interface signals representative of said address digit.

21. For use with a first communications line for communicating combinations of first and second electrical interface signals representative of address digits and a second communications line for communicating analog address digit signals representative of said address digits, a channel unit for interfacing the different representations of said address digits on said first and second lines comprising:

first line receive converter means for converting said first and second electrical interface signals to first and second logic level signals;

receiver means responsive to a first predetermined series of said first and second logic level signals representative of a first of said address digits for generating a first encoded address digit signal representative of said first address digit; and transmitter means responsive to said first encoded address digit signal for transmitting to said second line a first of said analog address digit signals representative of said first address digit.

22. The channel unit in accordance with claim 21 wherein said receiver means comprises means reponsive to a second of said analog digit signals representative of a second of said address digits for generating a second encoded address digit signal representative of said second address digit and wherein said channel unit further comprises control means responsive to said second encoded address digit signal for generating a second predetermined series of said first and second logic level signals representative of said second address digit and first line transmit converter means for converting said second predetermined series of said first and second logic level signals to one of said combinations of said first and second electrical interface signals representative of said second address digit.

23. The channel unit in accordance with claim 22 wherein said channel unit further comprises second line converter means for vonverting third and fourth electrical interface signals communicated on said second line to said first and second logic level signals and wherein said receiver means is also responsive to a third predetermined series of said first and second logic level signals representative of said second address digit for generating said second encoded address digit signal.

24. The channel unit in accordance with claim 23 wherein said control means comprises means responsive to said first encoded address digit signal for generating a fourth predetermined series of said first and second logic level signals representative of said second address digit and wherein said second line converter means comprises means for converting said fourth predetermined series of said first and second logic level signals to a combination of said third and fourth electrical interfaces signals representative of said second address digit.

25. For use with a first communications line for communicating a combination of first and second electrical interface signals representative of an address digit and a second communications line for communicating a combination of third and fourth electrical interface signals representative of said address digit and different from said first and second electrical interface signals, a channel unit for interfacing the different representations of said address digit on said first and second lines comprising:

second line converter means for converting said third and fourth electrical interface signals to first and second logic level signals;

receiver means responsive to a first predetermined series of said first and second logic level signals representative of said address digit for generating an encoded address digit signal representative of said address digit;

control means responsive to said encoded adress digit signal for generating a second predetermined series of said first and second logic level signals representative of said address digit; and first line transmit converter means for converting said second predetermined series of said first and second logic level signals to said combination of first and second electrical interface signals representative of said address digit.

26. The channel unit in accordance with claim 25 wherein said receiver means comprises means responsive to an analog signal communicated on said second line and representative of said address digit for generating said encoded signal representative of said address digit.

27. The channel unit in accordance with claim 25 in which said first and second logic level signals of said second predetermined series occur for respective first and second time intervals and wherein said control means further comprises means responsive to said encoded signal for generating a third predetermined series of said first and second logic level signals representative of said address digit, said first and second logic level signals of said third predetermined series occurring for respective third and fourth time intervals corresponding to said first and second time intervals, respectively.

28. The channel unit in accordance with claim 25 in which said channel unit further comprises first line receive converter means for converting said combination of first and second electrical interface signals representative of said address digit to said first predetermined series of said first and second logic level signals representative of said address digit; wherein said control means further comprises means responsive to said encoded signal for generating a third predetermined series of said first and second logic level signals representative of said address digit; and wherein said second line converter means comprises means for converting said third predetermined series of said first and second logic level signals to said combination of said third and fourth electrical interface signals representative of said address digit.

29. For use with a first communications line utilizing a first signaling protocol and a second communications line utilizing a second signaling protocol different from said first signaling protocol, a channel unit for interface communication of said signaling protocols comprising:

control means responsive to a first set of electrical interface signals indicative of a first state in said first signaling protocol of a call when on said first line for generating a first control signal and second line transmit coverter means responsive to receipt of a generated said first control sigal for generating on said second line a second set of electrical interface signals to signify for said call a first state in said second signaling protocol corresponding to said first state of said call in said first signaling protocol.

30. The channel unit in accordance with claim 29 wherein said control means is also responsive to a third set of electrical interface signals indicative of a second state of said call when on said second line for generating a second control signal and wherein said channel unit firther comprises first line transmit converter means responsive to a receipt of said second control signal for generating on said first line a fourth set of electrical interface signals to signify for said call a second state in said first signaling protocol corresponding to second state of said call in said second signaling protocol.

31. A multiprotocol interface unit for first and second communications channels and comprising:
control means responsive to a first set of electrical signals in a first signaling protocol representative of a first communications state on said first channel and to a second communications state on said first channel occurring previous to said first state for generating a first control signal, and
means responsive to said control signal when generated for producing on said second channel a second set of electrical signals in a second and different signaling protocol than said first protocol and representing a communications state on said second channel correlated to said first communications state on said first channel.

32. The unit of claim 31 further comprising means for selecting one of a plurality of signaling protocols for use with said second channel.

* * * * *

UNITED STATES PATENT AND TRADEMARK OFFICE
CERTIFICATE OF CORRECTION

PATENT NO. : 4,623,760
DATED : November 18, 1986
INVENTOR(S) : Mark S. Binkerd, William C. Sand It is certified that error appears in the above-identified patent and that said Letters Patent is hereby corrected as shown below:

IN THE SPECIFICATION

Figure 25:
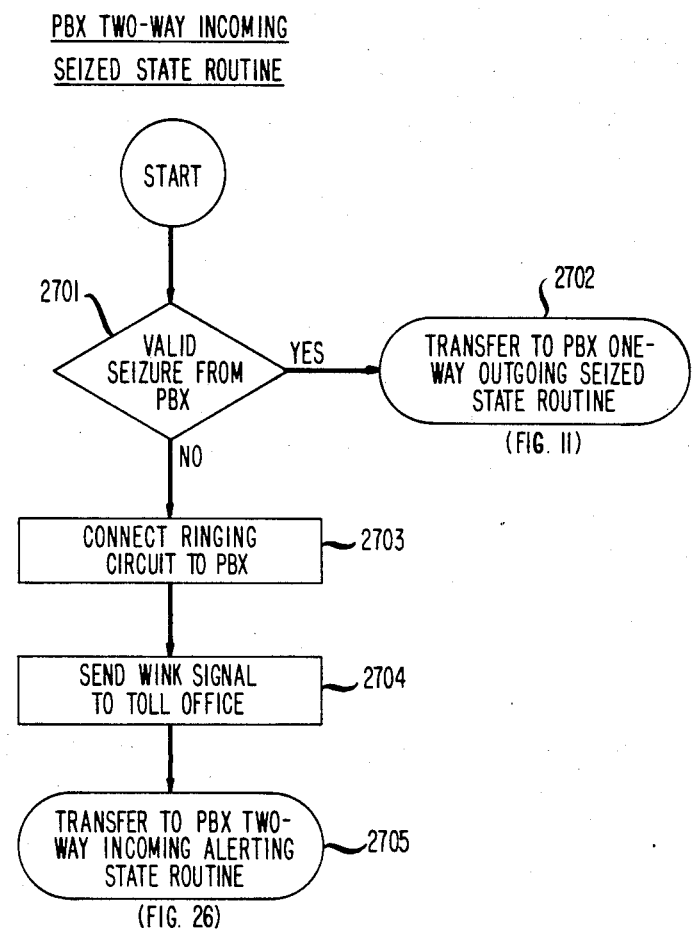
Figure 26:
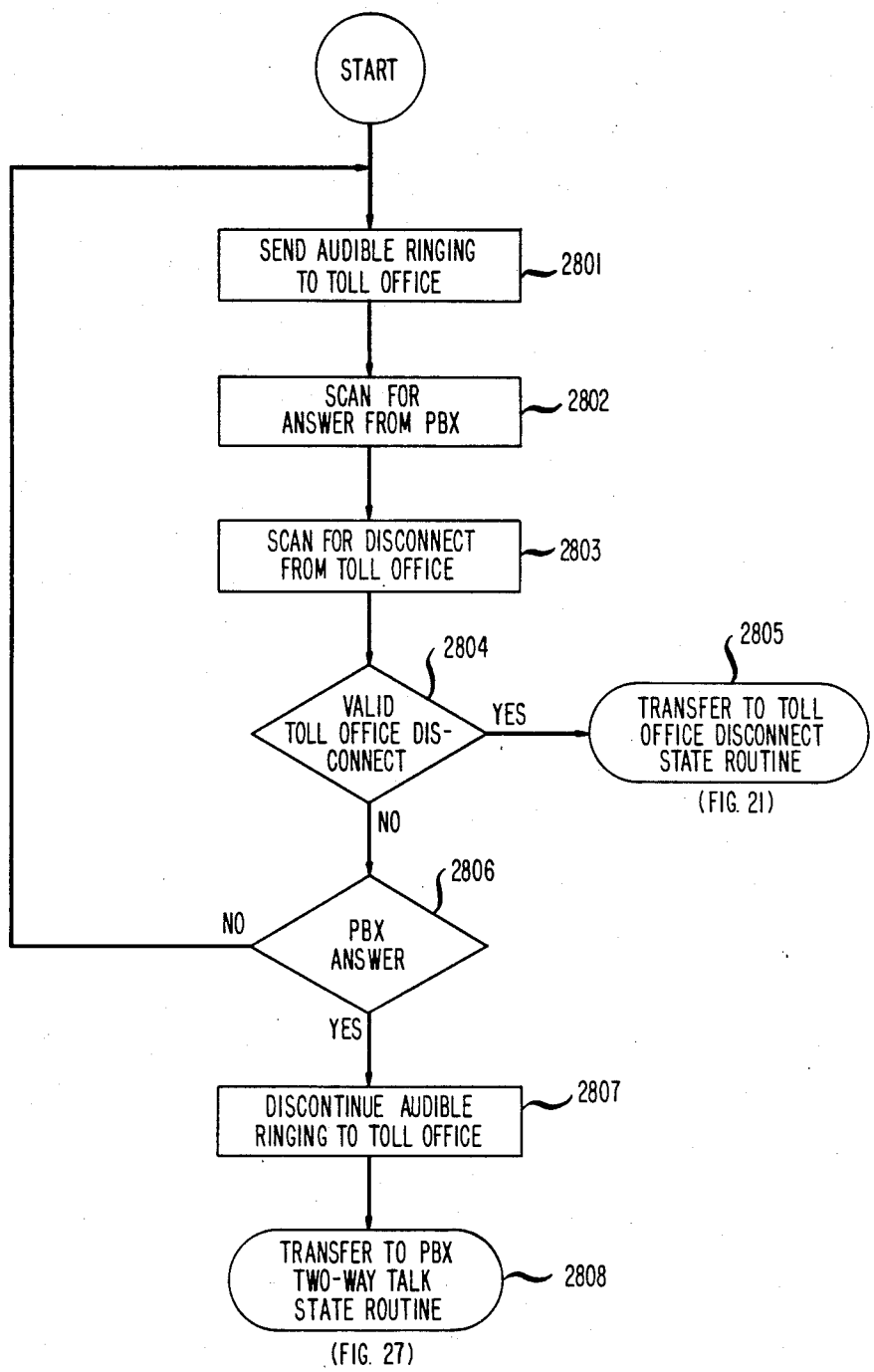
Figure 27:
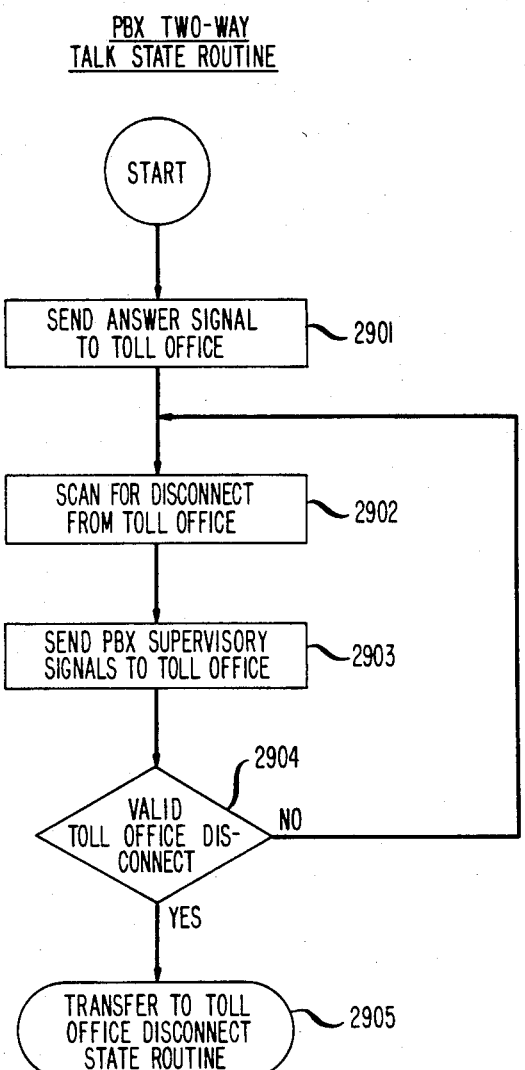

Column 4, line 37, "FIG. 25" should be "FIG. 23";
Column 19, line 2, after "PBX" insert a period.

IN THE CLAIMS

Column 26, lines 24 and 25, "repersentative" should be "representative";
Column 26, line 26, after "line" insert a comma;
Column 28, line 66, "accordacne" should be "accordance";
Column 29, line 15, "level signal" should be "level signals";
Column 30, line 7, "converter means comprise a means" should be "converter means comprises means";
Column 31, line 34, "reponsive" should be "responsive";
Column 31, line 50, "vonverting" should be "converting";
Column 33, line 2, "sigal" should be "signal";
Column 33, line 13, "firther" should be "further".

Signed and Sealed this

First Day of October, 1991

*Attest:*

HARRY F. MANBECK, JR.

*Attesting Officer*   *Commissioner of Patents and Trademarks*